US008202099B2

(12) United States Patent
Lancaster

(10) Patent No.: US 8,202,099 B2
(45) Date of Patent: Jun. 19, 2012

(54) INSTRUCTIONAL SYSTEM AND METHOD FOR LEARNING READING

(76) Inventor: J. (James) Justin Lancaster, Quechee, VT (US)

( * ) Notice: Subject to any disclaimer, the term of this patent is extended or adjusted under 35 U.S.C. 154(b) by 1173 days.

(21) Appl. No.: 11/966,930

(22) Filed: Dec. 28, 2007

(65) Prior Publication Data

US 2008/0187892 A1 Aug. 7, 2008

Related U.S. Application Data

(60) Provisional application No. 60/878,260, filed on Jan. 3, 2007.

(51) Int. Cl.
G09B 25/00 (2006.01)
(52) U.S. Cl. .................. 434/403; 434/167
(58) Field of Classification Search .............. 434/156, 434/159, 167, 171, 172, 176, 178, 403; D19/59
See application file for complete search history.

(56) References Cited

U.S. PATENT DOCUMENTS

| | | | | | |
|---|---|---|---|---|---|
| 1,286,631 | A | * | 12/1918 | Hillyard | 434/170 |
| 1,542,031 | A | * | 6/1925 | Bruhn | 434/172 |
| 2,483,833 | A | * | 10/1949 | Levin | 434/159 |
| 2,987,833 | A | * | 6/1961 | Stolpen | 434/167 |
| 3,215,435 | A | * | 11/1965 | Rheingruber | 273/249 |
| 3,728,800 | A | * | 4/1973 | Magram | 434/171 |
| 5,152,690 | A | * | 10/1992 | Todd | 434/113 |
| 5,275,567 | A | * | 1/1994 | Whitfield | 434/113 |
| 5,833,465 | A | * | 11/1998 | Jarzewiak | 434/171 |
| 5,863,204 | A | * | 1/1999 | Fulton | 434/172 |
| 6,271,453 | B1 | * | 8/2001 | Hacker | 84/476 |
| 6,786,729 | B2 | * | 9/2004 | Lee | 434/159 |
| 7,011,525 | B2 | * | 3/2006 | Mejia | 434/167 |
| 7,018,210 | B2 | * | 3/2006 | Goldman et al. | 434/172 |
| D590,442 | S | * | 4/2009 | Jones | D19/59 |
| 7,614,881 | B2 | * | 11/2009 | Bagues | 434/188 |

OTHER PUBLICATIONS

Author Unknown—SUPERDAIRYBOY.COM; Little Reader BLOCKS; http://web.archive.org/web/20021124015318/http://superdairyboy.com/constructiontoys/reader_blocks.html; Nov. 24, 2002; pp. 1-4 [reference is to instructional reading blocks containing words, including word "cat"; however, no mention of using only capital letters and using only three-letter words, and no specific arrangement of words on blocks to enable phoneme-substitution comparisons].

(Continued)

*Primary Examiner* — Kurt Fernstrom
(74) *Attorney, Agent, or Firm* — J. Justin Lancaster

(57) ABSTRACT

A system for teaching reading to very young children and first-time English students provides and uses one or more sets of instructional alphabetic letters, double-consonant phonemes, a relatively larger group of three-letter words of only short-vowel sounds, a relatively smaller group of three- and four-letter words with long-vowel sounds, and specifically designed subsets and/or combinations thereof, where the separate letters and words in the set is fewer than 100. The words in the instructional set are particularly selected to avoid phonetic confusion, ease pronunciation, engage student interest, provide teaching leverage based on each subset, and accelerate learning. In one embodiment, a particular 48-word instructional word set is distributed onto eight, 3-D, instructional blocks in a manner that preserves the subset-based teaching method. In other embodiments, the system can be presented on flashcards, magnets, printing on clothing or wallpaper, and through instructional computer software (home, internet, or PDA).

20 Claims, 24 Drawing Sheets

OTHER PUBLICATIONS

Armbruster; Put Reading First: The Research Building Blocks . . . ; http://www.nifl.gov/publications/pdf/PRFbooklet.pdf; 2006; pp. 1-60; Publ. By NIFL; Jessup, MD [reference is to instructional methods for reading, with relevant material in pp. 1-10, such as using phoneme awareness, including word "jam", and describing phoneme substitution, such as "bug" and "Bun" (p. 5); however no mention of using only capital letters and only 3-letter words and no mention of blocks or specific arrangement of.

* cited by examiner

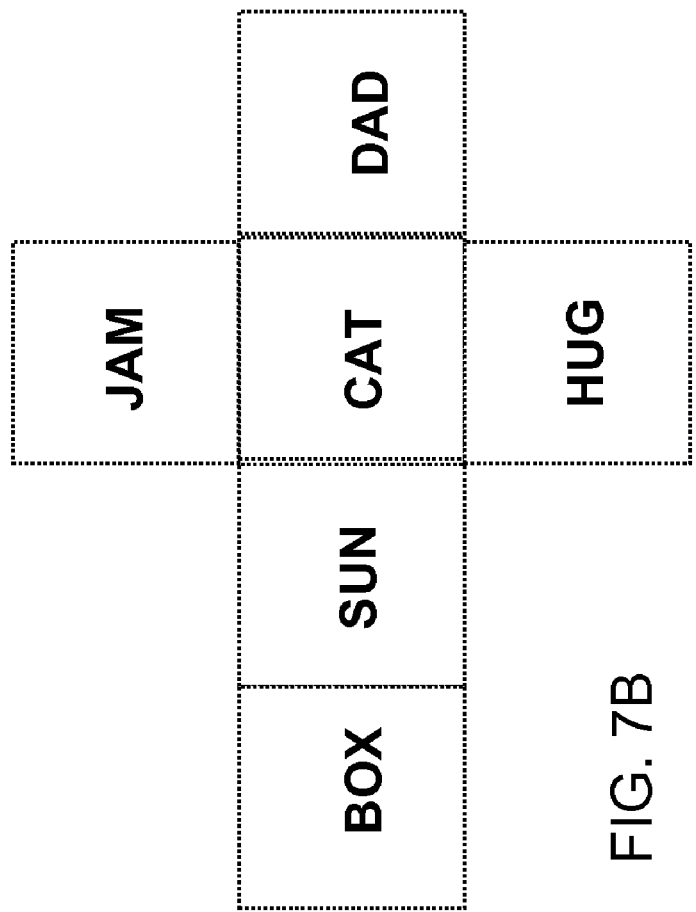
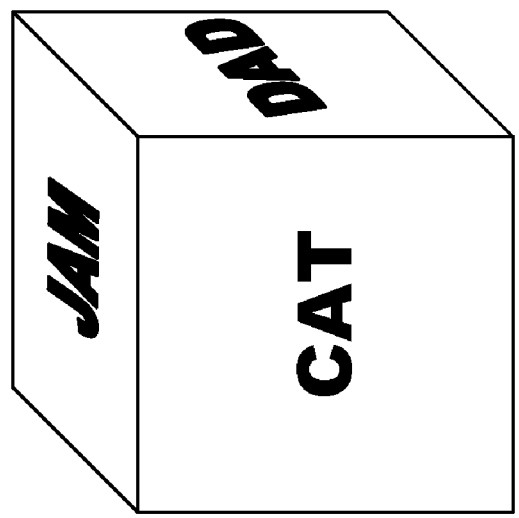
FIG. 7A
FIG. 7B

INSTRUCTIONAL SYSTEM AND METHOD FOR LEARNING READING

RELATED APPLICATIONS

This application claims priority to U.S. Provisional Patent Application No. 60/878,260, filed Jan. 3, 2007, the entire teachings of which are incorporated herein by reference.

BACKGROUND

Many methods, devices and systems previously have been developed to assist teaching children and non-English speakers how to read English. Examples include reading games, building blocks with letters on each face, phonics flashcards with and without pictures, words on magnets, easy-reader books with words in large font and with words associated with pictures, as well as many mechanical and various audio-visual aids.

Previously, authors of materials for teaching the first steps of reading have made efforts to present simple words that young children are better able to understand and to pronounce themselves. As well, many young adult and adult students of English who are encountering the language for the first time can benefit from instructional materials that are designed for learning the language in distinct approaches and along certain pathways of simple to more complex.

Phonics instruction in the English language teaches children or newcomers to the language the relationships between the letters (graphemes) of written language and the individual sounds (phonemes) of spoken language. It teaches using these relationships to read and write words. Teachers of reading and publishers of programs of beginning reading instruction sometimes use different labels to describe the grapheme-phoneme relationships, such as letter-sound associations; letter-sound correspondences; sound-symbol correspondences; and/or sound-spellings. Regardless of the label, the goal of phonics instruction is to help the beginning student to learn and use the alphabetic principle—the understanding that there are systematic and predictable relationships between written letters and spoken sounds. Knowing these relationships helps the student to recognize familiar words accurately and automatically, and "decode" new words. Knowledge of the alphabetic principle contributes greatly to children's ability to read words both in isolation and in connected text.

An effective program of phonics instruction helps the teacher explicitly and systematically instruct students in how to relate letters and sounds, how to break spoken words into sounds, and how to blend sounds to form words; helps students understand why they are learning the relationships between letters and sounds; helps students apply their knowledge of phonics as they read words, sentences, and text; helps students apply what they learn about sounds and letters to their own writing; can be adapted to the needs of individual students, based on assessment; and includes alphabetic knowledge, phonemic awareness, vocabulary development, and the reading of text, as well as systematic phonics instruction.

"Phonemic awareness" is the ability to notice, hear, identify, think about, and work with the individual sounds in spoken words. Phonemic awareness is important because it improves children's word and reading comprehension, it helps children learn to spell. Before children learn to read print, they need to become aware of how the sounds in words work. They must understand that words are made up of speech sounds, or phonemes.

"Phonemes" are the smallest parts of sound in a spoken word that make a difference in the word's meaning. For example, changing the first phoneme in the word hat from /h/ to /p/ changes the word from "hat" to "pat," and so changes the meaning (a letter between slash marks indicates herein the phoneme, or sound, that the letter represents, and not the name of the letter—for example, the letter h represents the sound /h/). English has about 41 phonemes. A few words, such as "a" or "oh," have only one phoneme. Most words, however, have more than one phoneme: for example, "if" has two phonemes (/i/ /f/), check has three phonemes (/ch/ /e/ /k/), and stop has four phonemes (/s/ /t/ /o/ /p/). One phoneme can be represented by more than one letter.

A "grapheme" is the smallest part of written language that represents a phoneme in the spelling of a word. A grapheme may be just one letter, such as b, d, f, p, s; or several letters, such as ch, sh, th, -ck, ea, -igh.

Students show phonemic awareness in several ways, including: recognizing words in a set of words that begin with the same sound (e.g., BAT, BAG, and BOY all have /B/ at the beginning); isolating and saying the first or last sound in a word (e.g., the beginning sound of DOG is /D/, and the ending sound of SIT is /T/); combining, or blending the separate sounds in a word to say the word ("/P/, /A/, /T/ —PAT"); and/or segmenting a word into its separate sounds ("CUP—/C/, /U/, /P/").

Instruction in phonics can include many different aspects of improving phoneme awareness, including: phoneme isolation (recognizing individual sounds in a word); phoneme identity (recognizing the same sounds in different words); phoneme categorization (recognizing the word in a set of three or four words that has a different sound; phoneme blending (from a sequence of separately spoken phonemes, combining the phonemes to form a word, then reading the word); phoneme segmentation (breaking a word into its separate sounds, then read the word); phoneme deletion (recognizing a word that remains when a phoneme is removed from another word); phoneme addition (making a new word by adding a phoneme to an existing word). phoneme substitution (substituting one phoneme for another to make a new word).

Importantly, although English spellings are irregular and phonics instruction can only take a student so far in learning the language, early phonics instruction teaches the student a system for remembering how to read English words. The memory of this principle helps them to read, spell, and recognize words more quickly and more accurately, with the process carrying over to all irregularly spelled words, where most of these words contain some regular letter-sound relationships that can help the student remember how to read them.

It has been shown that systematic and explicit phonics instruction improves a student's growth in reading [See: Bonnie B. Armbruster, B. B., and F. Lehr, "Put Reading First: The Research Building Blocks for Teaching Children to Read; Kindergarten Through Grade 3; Center for the Improvement of Early Reading Achievement (CIERA); National Institute for Literacy (NIFL); edited by C. R. Adler, RMC Corporation; 2006; http://www.nifl.gov/nifl/publications.html; herein incorporated by reference].

Systematic phonics instruction helps students learn to identify word and increases their ability to comprehend what they read. Reading words accurately and automatically enables students to focus on the meaning of text. Research shows that phonics instruction contributes to comprehension skills. Sight-word programs begin by teaching students a sight-word reading vocabulary of fewer than 100 words. After they learn to read these words students receive instruction in the alphabetic principle.

A popular and effective teaching method and system for English phonics for beginning students of English language is the flashcard. Many versions of such cards have been designed and used. Numerous companies sell sets of flashcards, many of which contain four-letter words and multiple compound consonants.

However, a weakness exists in previous methods, devices and systems for teaching beginning students of English phonetics, most notably in the common and popular flashcard sets used for teaching children: these methods and materials have not been designed suitably to avoid confusion for instructing the beginning students of English at their very first stages of seeing, recognizing and reading words.

Phonemic awareness instruction is most effective when children are taught to manipulate phonemes by using the letters of the alphabet and when instruction focuses on only one or two rather than several types of phoneme manipulation. Adding phonics workbooks or phonics activities to these programs of instruction can confuse rather than help students to read English.

Particularly for very young children, instructional reading materials, including phonics flashcards, have presented too much variation in many aspects of alphabet letters and words, such as, for example, mixing of capital letters and small letters, choosing of words that have little understandable relevance to very young children, presenting words with distracting pictures and methods, presenting words with confusing fonts, presenting words with long and short vowel sounds, and presenting words with too much variety of structures in the form of vowel-consonant (VC), consonant-vowel (CV), consonant-vowel-consonant (CVC), vowel-consonant-consonant (VCC), consonant-vowel-consonant-consonant (CVCC), consonant-vowel-consonant-vowel (CVCV), or multiple combinations thereof in words having multiple syllables.

Presenting sets of words to very early and/or young students of English is confusing and inefficient for learning when these word sets have mixtures of long vowel sounds and short vowel sounds, when words are used that are variably one, two, three, four, five, or more letters long, when the words have more than one syllable, and when the words are conceptually advanced or unfamiliar in relation to objects or ideas that are more comfortable and/or familiar to the very young mind, and/or when too many words are included in the instructional set.

The failings in prior instructional materials confuse and fatigue the beginning reader, and they distract the student substantially from focusing on quickly learning the sounds of the English consonants, such as, for example, initially learning the short vowel sounds and reading first, simple words.

Therefore, there is need for an improved instructional reading method, instructional system and instructional reading materials for teaching beginning students of English in their very first reading steps.

SUMMARY

A preferred embodiment of the present invention provides an instructional reading method and set of instructional materials that reduce the variables that the student encounters in the student's first exposure to reading English words, wherein a specific set of training words is limited substantially or completely to words wherein each word is not longer than four letters, having only a single syllable, containing only a single vowel and wherein the vowels are pronounced with the short vowel sound.

One preferred embodiment provides for instructional reading materials for beginners learning English comprising a specific set of training words wherein the training words consist of a set of 48 specific three-letter words or a subset selected from this specific 48-word set. The words of the 48-word set are intentionally selected for advantages related to pronunciation and learning, owing to these words having only one syllable and a single vowel pronounced with the short-vowel sound, for advantages related to these particular words being relatively more familiar in the minds of very young students than other three-letter words, and for advantages related to these particular words engaging the imagination of very young students to a relatively greater degree than other three-letter words. The set of words is specifically selected to avoid the disadvantages of conceptually difficult, uninteresting and/or confusing words, as well as to avoid words that present different sounds for the same letter.

Another preferred embodiment of the invention further provides for instructional reading materials for students beginning to read English words comprising a set of training words wherein the training words consist of a set of fewer than twenty specific three-letter English words, preferably comprising a set of fewer than 15 specific three-letter English words, wherein all 26 letters of the English alphabet are present within the set of training words, wherein further the words have only one syllable and are of the form consonant-vowel-consonant (CVC), and wherein the vowels are presented in their short-vowel sound form (with one exception for the word containing the letter "Q" where the "U" is presented in its conjunction form with "Q"). The words of this set are specifically selected for advantages related to pronunciation and learning, owing to the words being conceptually accessible to the mind of the beginning reading student. The set of words is specifically selected to avoid the disadvantages of conceptually difficult and/or confusing words and words that present different sounds for the same letter.

A further preferred embodiment of the invention provides an instructional method whereby a teacher uses the specific set of instructional materials in a progressive fashion to familiarize the student with each of the sounds of the consonants and the vowels as they appear in the words. The method comprises the teacher reading the word, then reading the word with the single syllable expressed as a sequence of three distinctively separated sounds, followed by a final reading of the word, such as, for example, "BUG", then "Bh"-"Uh"-"Gh", and then again "BUG."

The method further provides for the teacher optionally to instruct with, or move through, the sets of words in smaller subgroups, whereby each group is associated conceptually (and thereby imaginatively in the mind of the student), such as, for instance, initiating a teaching session with a subset comprising tangible objects, family members, verbs or various household objects or food. The instructional materials and method provide for focusing training sessions on symmetrical words to make it easier for the student to distinguish the consonant sounds from the vowel sounds.

BRIEF DESCRIPTION OF THE DRAWINGS

FIG. 7A illustrates a second 3-D instructional block of a set of eight such blocks according to an embodiment of the invention.

FIG. 7B presents the schematic layout for the instructional words presented on the six faces of the 3-D block in FIG. 6A.

DETAILED DESCRIPTION

Figure 1:
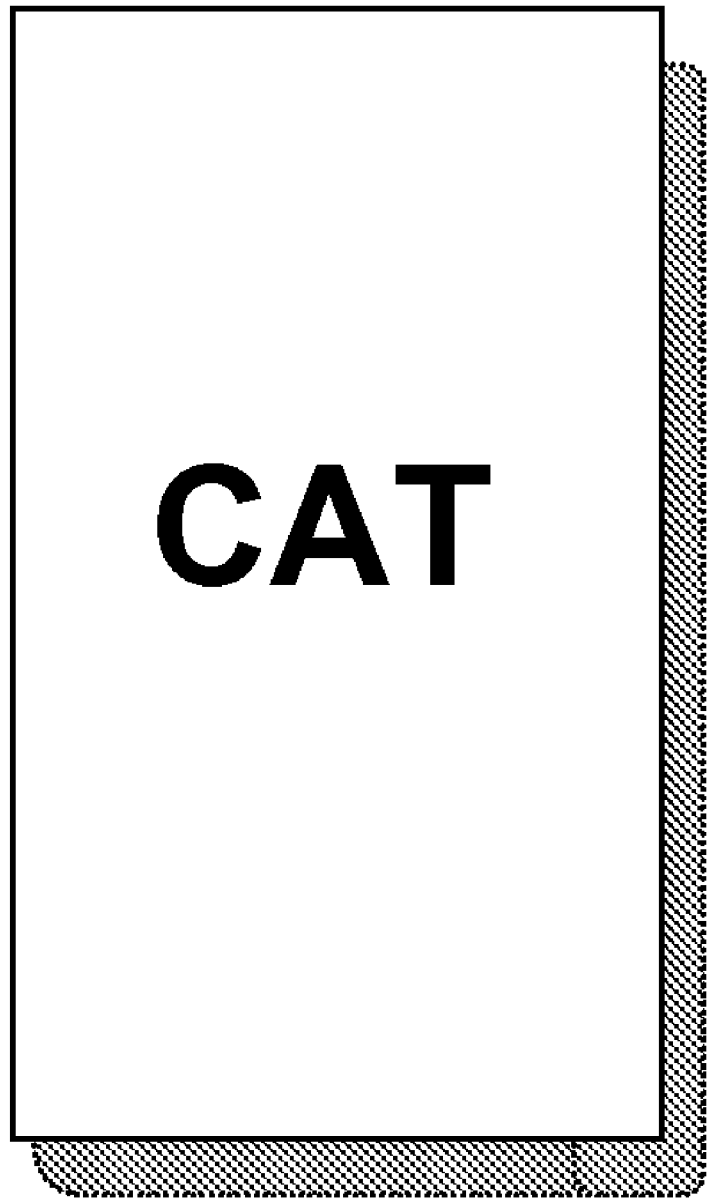
FIG. 1 illustrates one of a set of instructional reading cards (flashcard) according to an embodiment of the invention.

Phonics instruction helps children learn the relationships between the letters of written language and the sounds of spoken language. Phonics instruction is important because it leads to an understanding of the alphabetic principle—the systematic and predictable relationships between written letters and spoken sounds. Programs of phonics instruction are effective when they are systematic (i.e., the plan of instruction includes a carefully selected set of letter-sound relationships that are organized into a logical sequence, and when they are explicit (i.e., the programs provide teachers with precise directions for the teaching of these relationships. Effective phonics programs provide ample opportunities for children to apply what they are learning about letters and sounds to the reading of words, sentences, and stories. Systematic and explicit phonics instruction significantly improves children's word recognition, spelling, and reading comprehension. is most effective when it begins in kindergarten or first grade.

Systematic phonics instruction is the direct teaching of a set of letter-sound relationships in a clearly defined sequence. The set includes the major sound/spelling relationships of both consonants and vowels. In the case of young children, it has been shown that systematic phonics instruction produces the greatest impact on children's reading achievement when it begins at very young ages, for example, for some children as early as age two and three years, and at least by ages 4-6 or those ages corresponding to kindergarten and first grade. Both kindergarten and first-grade children who receive systematic phonics instruction are better at reading and spelling words than kindergarten and first-grade children who do not receive systematic instruction.

Children who receive instruction that focuses on one or two types of phoneme manipulation make greater gains in reading and spelling than do children who are taught three or more types of manipulation. One reason for this is that children who are taught many different ways to manipulate phonemes may become confused about which type to apply. Another explanation is that teaching many types of manipulations does not leave enough time to teach any one type thoroughly. A third explanation is that instruction that includes several types of manipulations may result in teaching children more difficult manipulations before they acquire skill in the easier ones.

Preferred embodiments of the invention generally relate to an instructional system for teaching English phonic awareness and reading. The system can comprise single letters of the alphabet and/or three-letter words being placed on a set of flashcards (or instructional phonetic reading cards, or in graphical depiction of words or flashcards by an instructional software program running in a computer), wherein a set of such flashcards will include at least specific set of three-letter words. Additional embodiments will include additional subsets of four-letter words or longer for specific additional purposes in teaching phonetic awareness at early stages of learning the English language.

Different embodiments of the invention provide for different specific sets of three-letter words, each set specifically chosen and formulated for a particular purpose, and each set conferring a particular advantage by its design. These instructional sets are further designed to have within them specific subsets that provide important and useful phonetic and graphemic examples for the specific instructional steps disclosed below in embodiments of the invented method for teaching phonetic awareness.

The invention includes within its scope multiple sets of words of three letters beyond the particular examples disclosed herein insofar as those sets will have the characteristics in keeping with the invention, as further described below. The scope of the invention, then, is not limited to only those exact sets of words disclosed herein, but extends to those additional sets of words that can be created in keeping with the constraints prescribed herein.

Preferred embodiments of the invention generally provide for sets of words to assist learning to read English wherein the words are specifically chosen to provide for minimal confusion in the perception and mind of the student and wherein the set of cards is efficiently chosen to provide broad exposure to the variety of the English alphabet.

One embodiment of the invention minimizes confusion for the student by providing a set of words that are each only three letters in length. As shown in FIG. 1, a three-letter word is placed on a flashcard (instructional phonetic reading card). The reading card is preferably durable. In a preferred embodiment the cards are constructed from strong cardboard paper 5"×7"×1/16"; this format is advantageous for some children because the large cards are easy and comfortable for children to hold and the substantial bulk of the card increases the attention given to the card by a child. Alternatively, the cards can be smaller or larger, constructed of other materials, such as plastic, paper, wood, fabric or metal, inter alia. Alternatively, the cards can be rendered as images on a computer screen as a result of a software program running in a computer program, for example, an English teaching software program. In a preferred embodiment, the invention provides a method whereby a teacher reads the card to the student. A further embodiment of the method of the invention can include the teacher requesting the student to repeat the sound of the teacher reading the card, and additionally the method can include the teacher asking the student to read the card.

It is to be understood in this application that reference to flashcards, cards, and/or instructional reading cards throughout the following discussion is exemplary, intended for the purposes of illustrating the invention, but not limiting the invention. Therefore, it is stressed that each and every reference herein to flashcards, cards and/or instructional reading cards is intended to include within the scope of the invention reference to other renderings or graphical depiction of the instructional letters and words in many manifestations, presentations and expressions that can be made according to the disclosure of the invention, such as, without limitation, rendering in an instructional computing device by instructional software program, including graphic depiction on clothing and toys, including presentation on magnets designed for auto travel or on magnetic substrates designed for attachment to metal appliances, such as a refrigerator, including presentation on 3-D cubes or blocks, and including presentation in workbooks and/or chapters of phonetic instructional materials.

It will be appreciated that the method described above can be designed and performed as part of a computerized learning program, wherein the reading of the card can be by automated, computerized voice, and the questioning of the student to repeat the sound can be instructed by computer program, and the computer program can also request the student to read the card and, using voice recognition software, the computer can translate the student's reading into word text and compare with the word presented on the screen and then provide the student with feedback as to the correctness of the student's reading.

An embodiment of the invention provides for an instructional system for teaching of English phonics and reading, comprising a set of instructional alphabetic letters, three-letter words or a combination thereof, at least a first subset of between 14 and 70 three-letter words having the structure consonant-vowel-consonant wherein the vowel has the short-vowel sound, optionally, a second subset consisting of the different letters of the English alphabet, and wherein the total of separate letters and words in the set is fewer than 100 letters and/or words. One version of this embodiment can optionally include a first subset that is the 26 letters of the English alphabet (i.e., A, B, C, C, E, F, G, H, I, J, K, L, M, N, O, P, Q, R, S, T, U, V, W, X, Y, and Z—known also as the Latin alphabet), wherein these letters are presented separately and individually on flashcards to allow training of the individual phonemes before advancing to learning and reading letters combined into words. In such a version, a second subset will comprise a group of words that are each only three letters in length and wherein the vowels "A", "E", "I", "O" and "U" are presented only in their short vowel sounds, such as, for example, the sound /A/ in the word "JAM", the sound /E/ in "HEN", the sound /I/ in the word "KIT", the sound /O/ in "COW" and the sound /U/ in "BUG".

Figure 2:
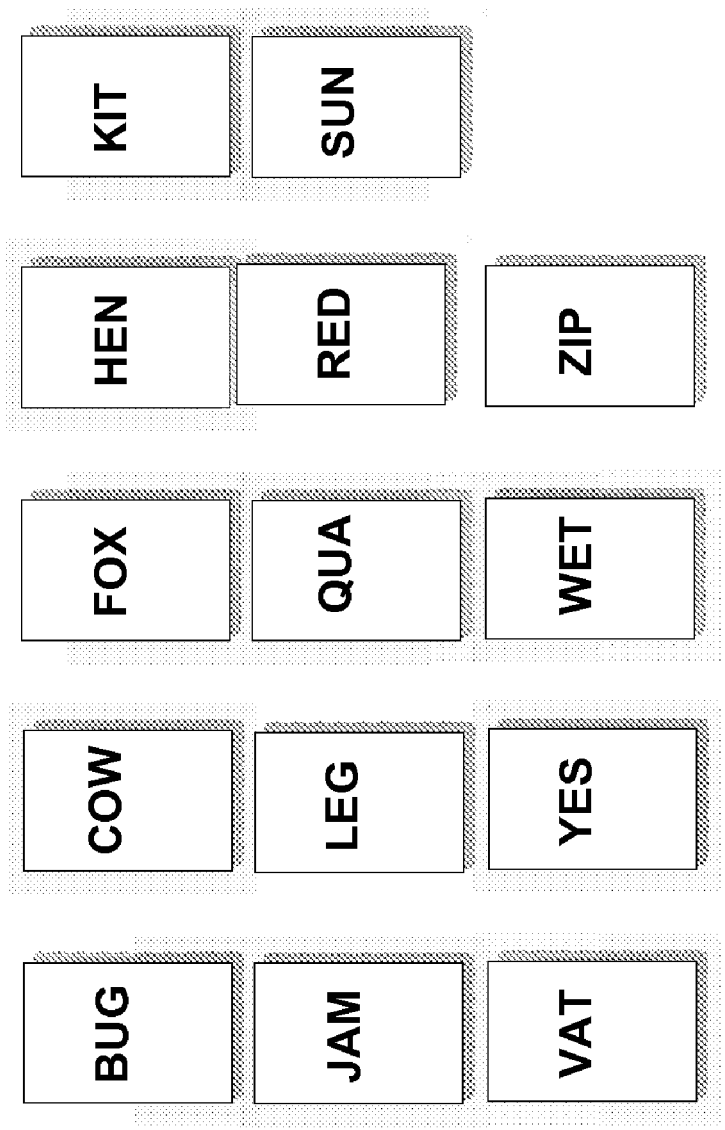
FIG. 2 illustrates a set of instructional reading cards according to an embodiment of the invention, wherein the words are in all capital printed letters.

One embodiment of the invention provides a set of instructional cards that is most preferred for high-efficiency of introducing students to the simpler sounds of all 26 letters of the English alphabet, from "A" to "Z" and including all the letters between. Referring to FIG. 2, a preferred embodiment comprises a set of fourteen three-letter words, each word placed upon a separate reading card, wherein the fourteen words present all 26 letters of the English alphabet, and wherein the vowels are presented in their short-vowel sound form (with one exception for the word "QUA" where the "U" is presented in its conjunction form with "Q"). In the preferred embodiment illustrated in FIG. 2, thirteen of the fourteen words are of the form consonant-vowel-consonant, so that the vowel is located in the same position in these thirteen words, and each vowel is presented at least twice (i.e., each vowel appears in at least two words). In this embodiment, only a word beginning with the letter "Q" differs from the consonant-vowel-consonant structure, which is required by this particular letter only.

Figure 3:
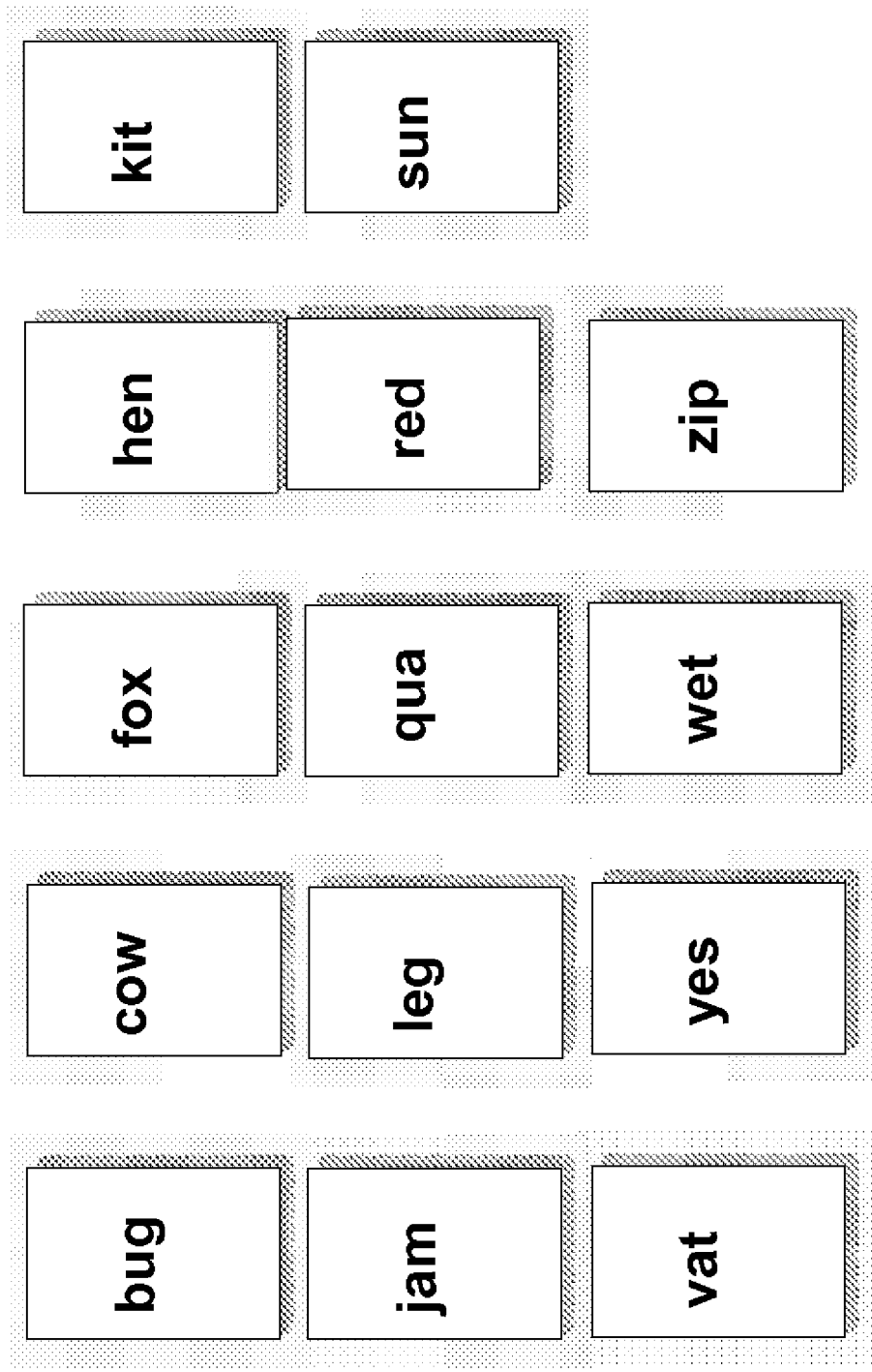
FIG. 3 illustrates a further set of instructional reading cards according to an embodiment of the invention, wherein the words are in all small printed letters.
Figure 4:
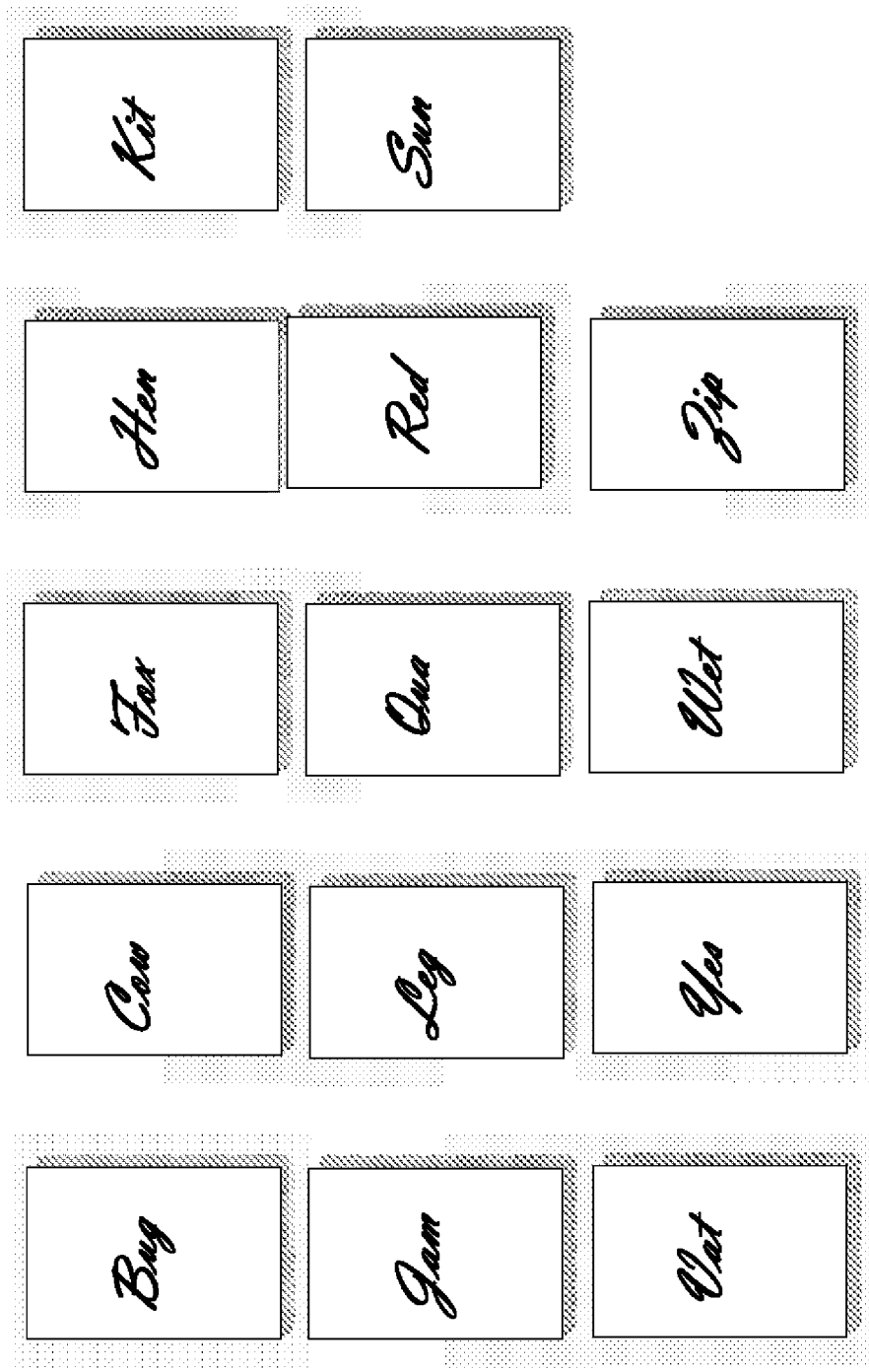
FIG. 4 illustrates a further set of instructional reading cards according to an embodiment of the invention, wherein the words are in both capitalized and small cursive script.

The embodiment illustrated in FIG. 2 is a preferred embodiment for a compact and efficient set of teaching words and/or reading flash cards for young adults and adults who are first being introduced to English as a second language. The cards can be made small for easy carrying in a pocket. Alternatively, all fourteen words can be printed on a single instructional reading card. In one embodiment, the instructional set can comprise the fourteen words BUG, COW, FOX, HEN, KIT, JAM, LEG, QUA, RED, SUN, VAT, YES, WET, and ZIP. The words are preferably printed in all capital letters in a very simple font in order to reduce confusion and distraction, as shown in FIG. 2. However, alternative embodiments can include flashcard sets containing words that are printed in all small letters, such as shown in FIG. 3, and/or words that are presented in cursive script, with capitalized first letter, as illustrated in FIG. 4. Alternatively, all three modes of presenting the word and/or additional modes can be included on a single card for each word.

Another preferred embodiment of the invention provides for an instructional system comprising a set of English words assembled for teaching the very earliest stages of reading of the English language, wherein there are fewer than 100 words in the instructional set, preferably fewer than 70 words in the instructional set, and most preferably fewer than 50 English words in the instructional set, and wherein said set comprises at least twenty words from the following group: "BUG, SON, SIX, ANT, PIG, BOX, ELF, NUT, TOY, BIB, BAT, TOP, DAD, CUP, LOG, FAT, ARM, SIT, WOW, PAT, DOG, MOM, DIG, EGG, MOP, JAM, LIP, BOY, BAG, RED, POT, WET, NET, HUG, CAT, SUN, BED, LEG, HEN, CAN, FOX, OWL, MAN, JAR, DOT, COW, NAP, and TEN."

A further embodiment of the invention further provides for a set of three-letter words assembled for instructing the very earliest stages of reading of the English language wherein there are fewer than 100 words in the instructional word set, preferably not more than 75 words in the instructional word set, and most preferably fewer than 50 English words in the instructional set, and wherein said set comprises at least thirteen words and preferably more than 20 words from the following group: "BUG, SON, SIX, ANT, PIG, BOX, ELF, NUT, TOY, BIB, BAT, TOP, DAD, CUP, LOG, FAT, ARM, SIT, WOW, PAT, DOG, MOM, DIG, EGG, MOP, JAM, LIP, BOY, BAG, RED, POT, WET, NET, HUG, CAT, SUN, BED, LEG, HEN, CAN, FOX, OWL, MAN, JAR, DOT, COW, NAP, AND TEN."

Figure 5:
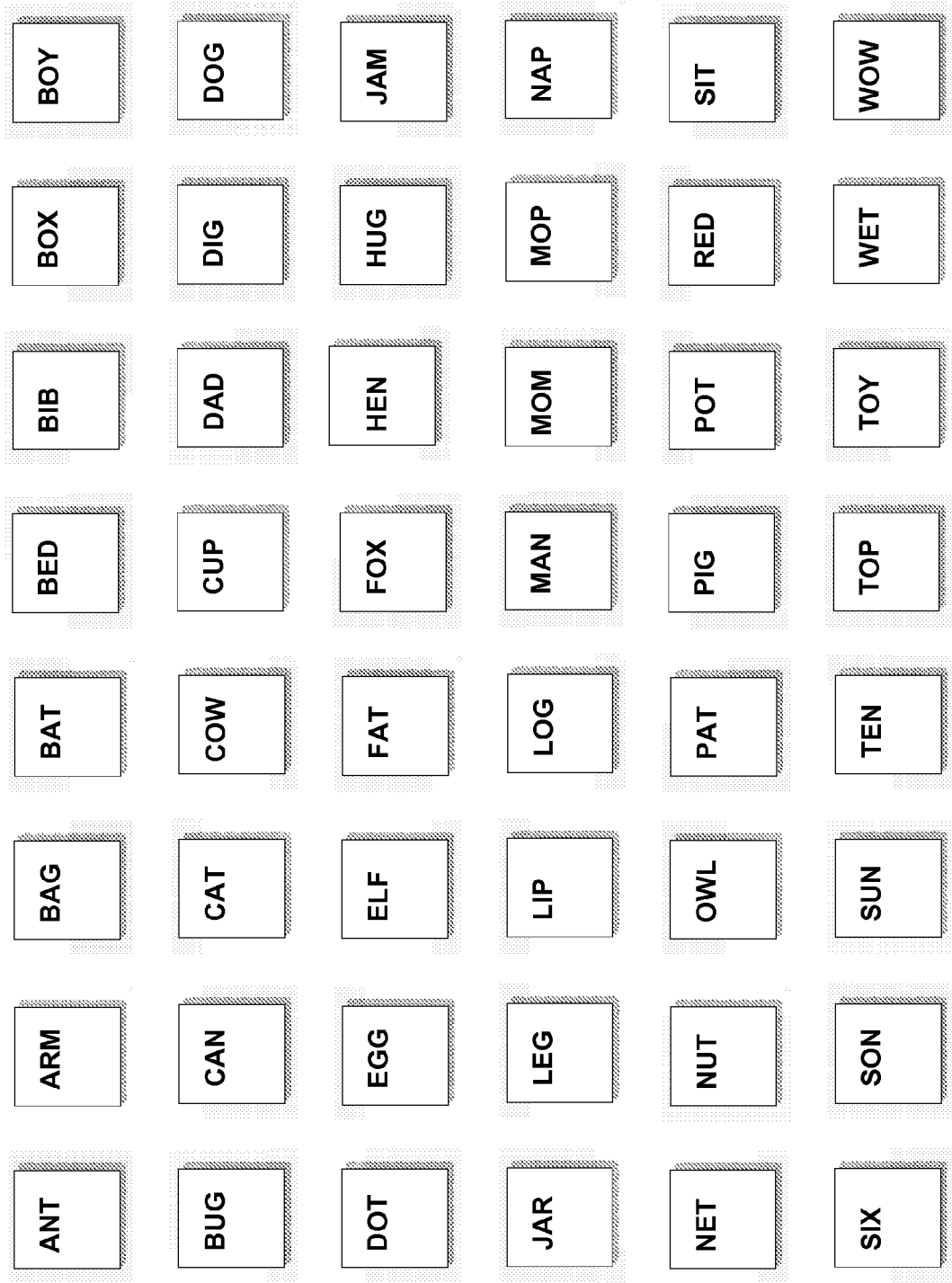
FIG. 5 illustrates a further set of instructional reading cards according to an embodiment of the invention.

Referring to FIG. 5, one embodiment provides for an instructional set of 48 specific reading cards corresponding to the 48 words of the above group, wherein these words are selected specifically to provide advantageous teaching sessions with very young children, owing to the words being related to tangible objects known to most children and/or related to actions and/or concepts familiar and interesting to the minds of such young children. A further embodiment can provide on a second back face of the flashcard a graphic picture of the object or action corresponding to each word on the first front face of the card.

A further preferred embodiment of the invention provides for an instructional method whereby a teacher uses the specific set of instructional materials in a progressive fashion to familiarize the student with each of the sound of the consonants and the vowels as they appear in the words. The method comprises the teacher reading the word, then reading the word with the single syllable expressed as a sequence of three distinctively separated sounds, followed by a final reading of the word, such as, for example, "BUG", then "/B/"-"/U/"-"/G/", and then again "BUG."

It is to be understood that the term "teacher" as used herein is to be construed most broadly, to include a parent, relative, friend and/or acquaintance of a student, and/or a school teacher, and/or an instructional voice speaking through a television, and/or through a computer, and/or through a personal digital assistant, including, without limitation, a synthesized voice generated by a computer program, which program can be interactive with the student via voice-recognition software and/or other computer input device, such as, for example, a computer keyboard and/or mouse and/or pointing device.

Therefore, it is to be understood that the specific sets and subsets of instructional letters and words described herein according to various embodiments of the invention are anticipated to be used and applied in many instructional settings, including, without limitation, through one-on-one personal interaction between human teacher and human student, through student use of multiple manifestations of the instructional materials (including letter and word subsets) placed on blocks, magnets, clothing and any other display and/or objects, and through operation of computer software instructional programs operated on individual computing devices and/or operational via the internet and the World Wide Web and various implementations of web pages.

One embodiment of the invention provides for a method of teaching a student phonetic awareness and/or teaching a student to read by using a specific set of instructional words according to the invention whereby the teaching method takes the student through a progressive training pathway with subsets (or subgroups) of the letters and words that comprise various embodiments of the instructional system according to the invention, whereby each subsets (or subgroup) can be comprised of words that are associated conceptually (and thereby imaginatively in the mind of the student), such as, for instance, initiating a teaching session with a subset comprising tangible objects, such as animals familiar to children (e.g., BUG, ANT, PIG, DOG, CAT, HEN, FOX, OWL, and COW), or members of a family familiar to children (e.g., SON, DAD, MOM, BOY, and MAN). Alternatively, the instructional materials and method provide for a teaching session to distinguish action words that are familiar to children (e.g., SIT, PAT, DIG, HUG, and NAP), numbers (e.g., SIX and TEN), parts of the body (e.g., LEG, ARM, and LIP), food objects (e.g., EGG, NUT, and JAM), kitchen objects (e.g., BIB, POT, JAR, CAN, CUP, and MOP,), and/or other household objects (e.g., BOX, TOY, BAT, TOP, BAG, NET, and BED). The instructional materials and method provide for focusing training sessions on symmetrical words (e.g., BIB, DAD, WOW, and MOM), which makes it much easier for the student to distinguish the consonant sounds from the vowel sounds. Also, the instructional materials and method provide for focusing training sessions on reading certain forward-backward word pairs (e.g., TOP_POT, and NET_TEN) that make it easier to distinguish and contrast the sounds of specific consonants. Further, the instructional materials and method provide for focusing short training sessions on reading certain word pairs in which only the first consonant changes between the spelling of one word in the pair and the other word in the pair, thus making it much easier to distinguish visually and by listening to, and to train through speaking, the consonant and vowel that are not changing and the consonant that is changed in each word-pair (e.g., the word-pairs: BAT_PAT; FAT_CAT; CAN_MAN; RED_BED; WET_NET; BOY_TOY; HUG_BUG; HEN_TEN; DOG_LOG; and/or WOW_COW), or certain word pairs in which only the second consonant changes between the spelling of one word in the pair and the other word in the pair (e.g., the word-pairs: DOG_DOT; SIT_SIX; JAM_JAR; MOP_MOM; and/or BOX_BOY), or certain word pairs in which the first and second consonant does not change between the spelling of one word in the pair and the other word in the pair, but the vowel changes (e.g., the word-pairs: LEG_LOG; NET_NUT; SON_SUN; BAG_BUG; PAT_POT; and/or DIG_DOG).

Further, the instructional materials and method provide for focusing short training sessions on reading certain words and/or word-pairs designed to illustrate the use and sound of two adjacent consonants (e.g., OWL; ELF; ANT, ARM; LEG_EGG). Further, the instructional materials and method provide for training reading on certain word-pairs designed to illustrate the effect of two words spelled differently that sound the same (e.g., SUN_SON).

An example of a teaching that illustrates one of the embodiments of the method of phonetic instruction according to the invention can include the following steps:

Step one: Obtain and/or assemble one of the instructional word sets according to the invention. In this example, the teacher (or teaching program if computer software) is working with an instructional system comprising a first subset of the 26 letters of the alphabet, a second subset comprising five phonemes /ch/, /sh/, /th/, /st/ and /ck/, a third subset consisting of the 48 words illustrated in FIG. 5, and a fourth subset consisting of the words CHIN, SHIN, THIN, STOP, PICK CHOP, SHOP, CHICK, STICK, and THICK Step two: Work with student on the alphabet cards, learning the alphabet letter names and learning the alphabet sounds. Important here is to familiarize the student with the sounds (phonemes) for each letter, i.e. "/A/", as well as the name of the letter. In this embodiment of the method the teacher stresses the phoneme for the short-vowel sounds of each vowel and the phoneme for each consonant that corresponds to the pronunciation of that consonant in the third subset of words from FIG. 5;

Step three: Work with the student on the alphabet card set, letters B, A, and T. Speak the letter sound (phonetic sounds "/B/, /A/ and /T/" rather than the names of the letters);

Step four: From the three-letter instructional words subset, work with the student on the word "BAT", steadily moving from "/B/-/A/-/T/" by blending the phoneme to obtain "BAT";

Step five: Work with the student on the alphabet card set, letters B, A and G. Speak the letter sound (phonetic sound rather than the name of the letter). From the three-letter instructional words set, work with the student on blending the phonemes "/B/-/A/-/G/" to obtain the word "BAG".

Step six: Continue the process of steps four and five for the remaining 46 words of the third subset; however, it is important and critical during this progression to repeat the previously learned words in a steadily building series of sentences and very short stories that use these words. For example, "The BAT is in the BAG," followed by learning the word "BED", which in turn is followed by the sentence to create an almost tangible image: "The BAT is in the BAG on the BED." Short sentences that use the specific words herein are critical to having the child's (or student's) mind imprint the word in a visual and emotional process within the mind;

Step seven: In moving through the words of subset three, follow the lines of the conceptual themes, i.e., for example, work through the parts of the body LIP, LEG and ARM (asking then "Where is your lip? Is this your leg? Can you lift your arm?", and then work through the people MOM, DAD, BOY and MAN (asking then "Where is your mom? Where is your dad? Are you a boy? Am I a man?"), and work through the animals DOG, CAT, PIG and HEN (then asking "What sound does a dog make? Does a cat say oink? Does a pig say meow? Does a hen say cluck, cluck?"). The conversation with these specific words is a key part of the method of using the instructional system according to the invention, and this aspect of the method is what governs and guides the particular design of the instructional subsets that comprise the instructional system disclosed herein according to the invention.

Step eight: Move through the word-pairs that were described above, such as BAT_PAT; FAT_CAT; CAN_MAN; RED_BED; WET_NET; BOY_TOY; HUG_BUG; HEN_TEN; DOG_LOG; COW_WOW; DOG_DOT; SIT_SIX; JAM_JAR; MOP_MOM; BOX_BOY; LEG_LOG; NET_NUT; SON_SUN; BAG_BUG; PAT_POT; and DIG_DOG. Again, it is an important aspect of the method according to the invention to exploit the particular design of this instructional subset to build short engaging stories and/or questions with the words that will arouse the interest and excitement of the young child student. For example: "We open the jar to get yummy jam;" "Wow, did you see that cow?;" "The boy is hiding in the box;" "Can you hug a bug?" "The dog likes to dig in the dirt."

Step nine: Work with the student on the second subset of phonemes /ch/, /sh/, /th/, /st/ and /ck/, developing a recognition of the specific sounds of these consonant pairs.

Step ten: Work on phoneme blending the consonant pair phonemes with the longer words of the fourth subset instructional words CHIN, SHIN, THIN, STOP, SOCK, CHOP, SHOP, CHICK, STICK, and THICK. Again, it is an important aspect of the method according to the invention to exploit the particular design of this instructional subset to build short engaging stories and/or questions with the words that will arouse the imagination of the student. For example: "Can you touch your chin to your shin?;" "Can you chop down a tree with your sock?;" "Shall we stop to shop for ice cream today?;" "Does a chick like to pick up a stick that is thick or a stick that is thin?"

An embodiment of the invention provides additionally for applying the training words of the specific 48-word training set described above, or a sub-set of that 48-word training word set to various types of instructional materials and/or objects associated with young children or with students, such as, for example, to magnetic components that can be attached to a metallic surface (such as a metallic classroom blackboard, or metallic panel for driving in a car, or a metallic refrigerator), or printed or otherwise affixed to cubes or rectangular blocks (wooden, plastic, or other material), or printed on any material (fabric, wallpaper, books, cups, spoons, plates, bibs, tablecloth, clothing, shoes, toys, hats, and the like.

Figure 6B:
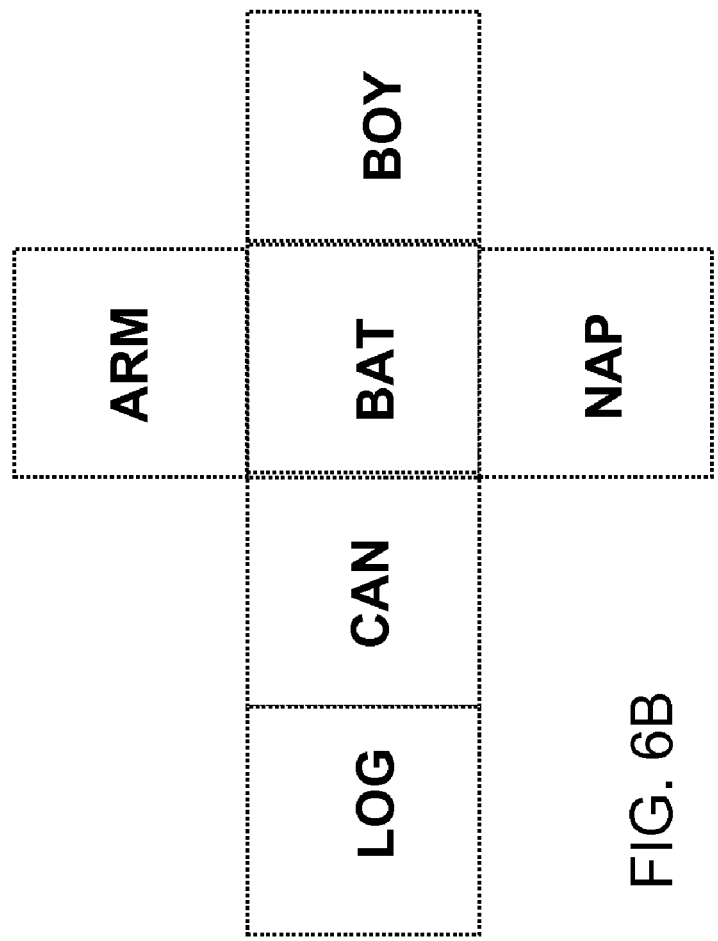
FIG. 6B presents the schematic layout for the instructional words presented on the six faces of the 3-D block in FIG. 6A.
Figure 6A:
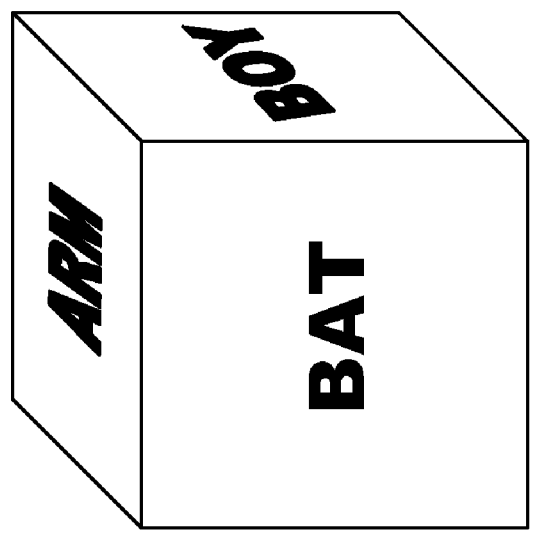
FIG. 6A illustrates a first 3-D instructional block of a set of eight such blocks according to an embodiment of the invention.
Figure 8B:
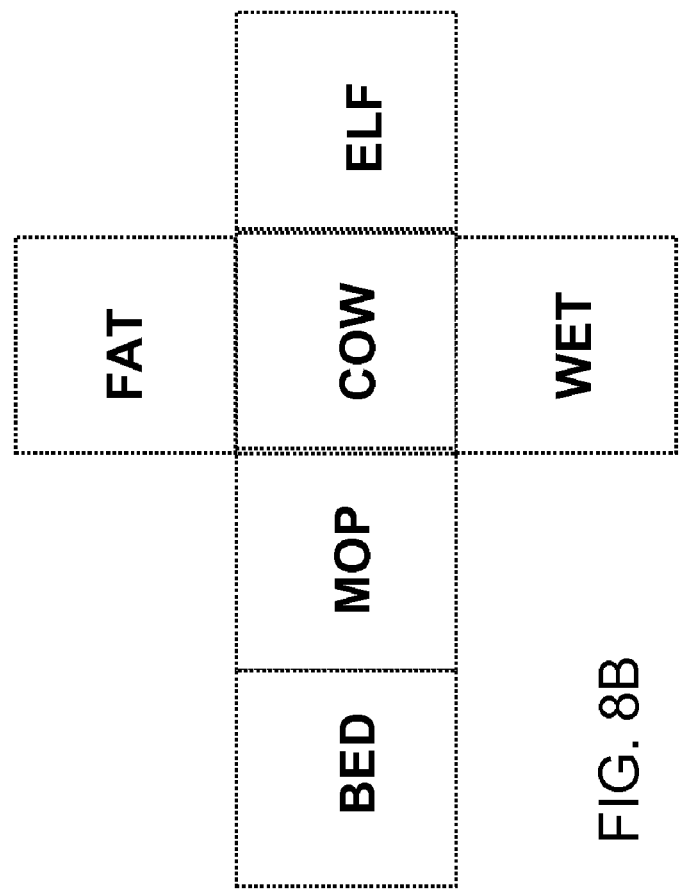
FIG. 8B presents the schematic layout for the instructional words presented on the six faces of the 3-D block in FIG. 6A.
Figure 8A:
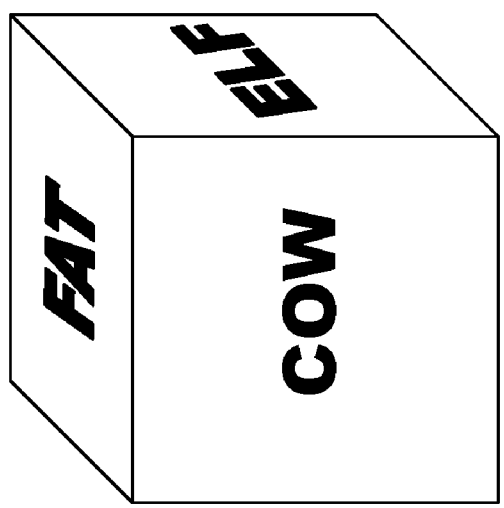
FIG. 8A illustrates a third 3-D instructional block of a set of eight such blocks according to an embodiment of the invention.
Figure 9B:
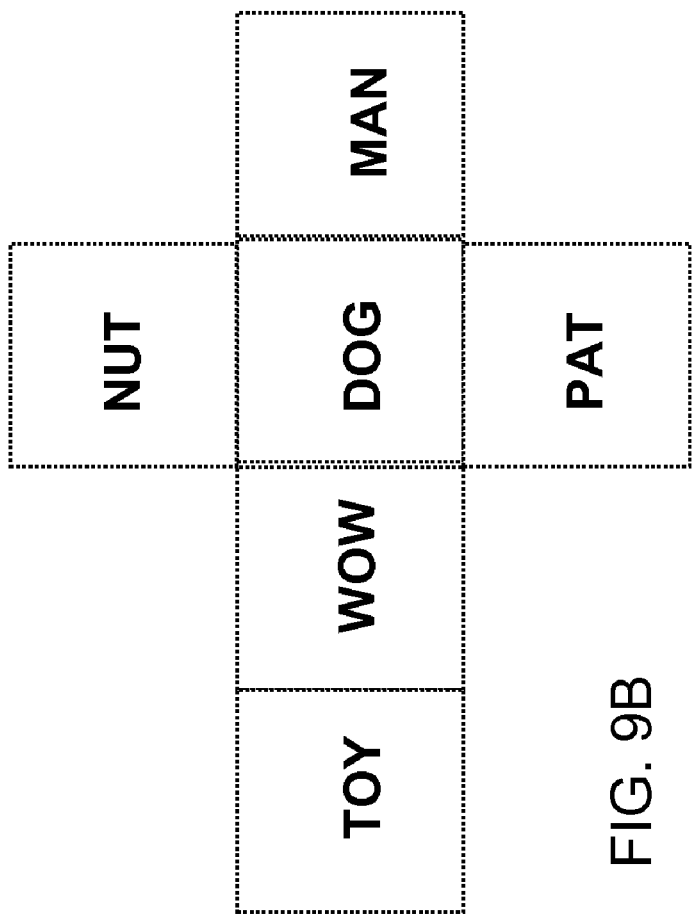
FIG. 9B presents the schematic layout for the instructional words presented on the six faces of the 3-D block in FIG. 6A.
Figure 9A:
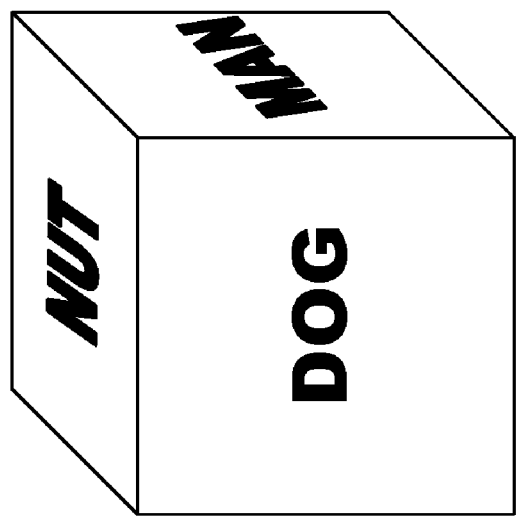
FIG. 9A illustrates a fourth 3-D instructional block of a set of eight such blocks according to an embodiment of the invention.
Figure 10B:
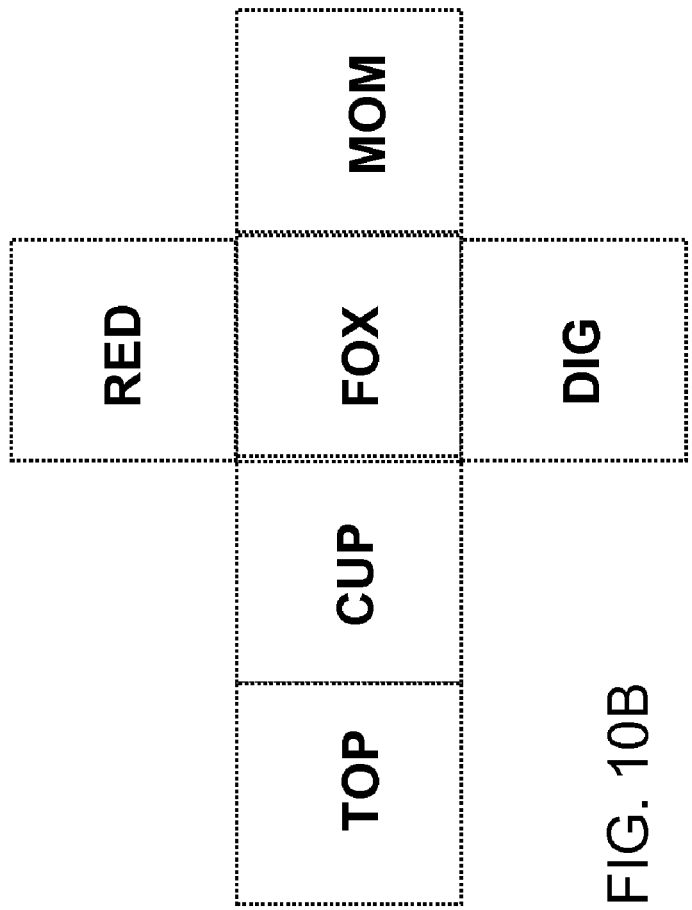
FIG. 10B presents the schematic layout for the instructional words presented on the six faces of the 3-D block in FIG. 6A.
Figure 10A:
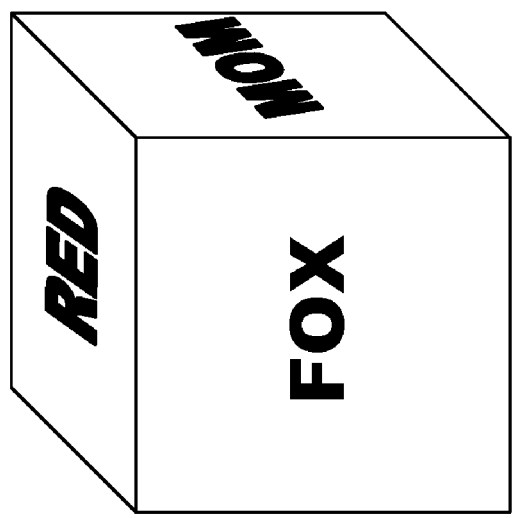
FIG. 10A illustrates a fifth 3-D instructional block of a set of eight such blocks according to an embodiment of the invention.
Figure 11B:
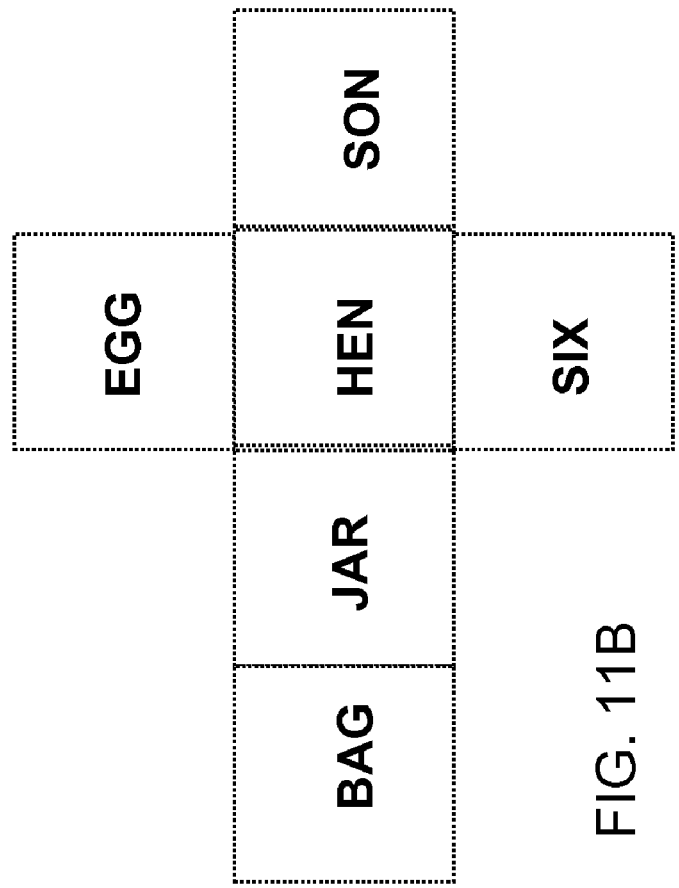
FIG. 11B presents the schematic layout for the instructional words presented on the six faces of the 3-D block in FIG. 6A.
Figure 11A:
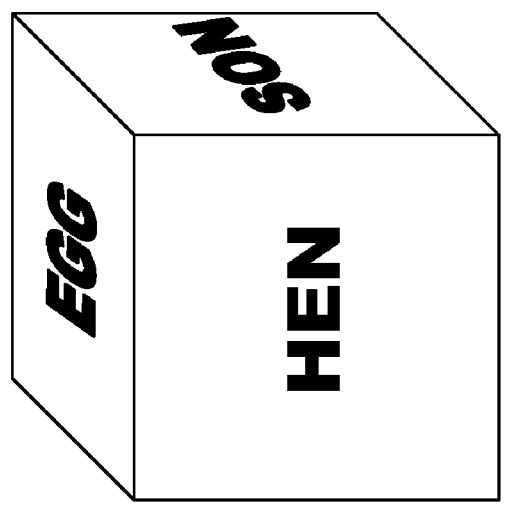
FIG. 11A illustrates a sixth 3-D instructional block of a set of eight such blocks according to an embodiment of the invention.
Figure 12B:
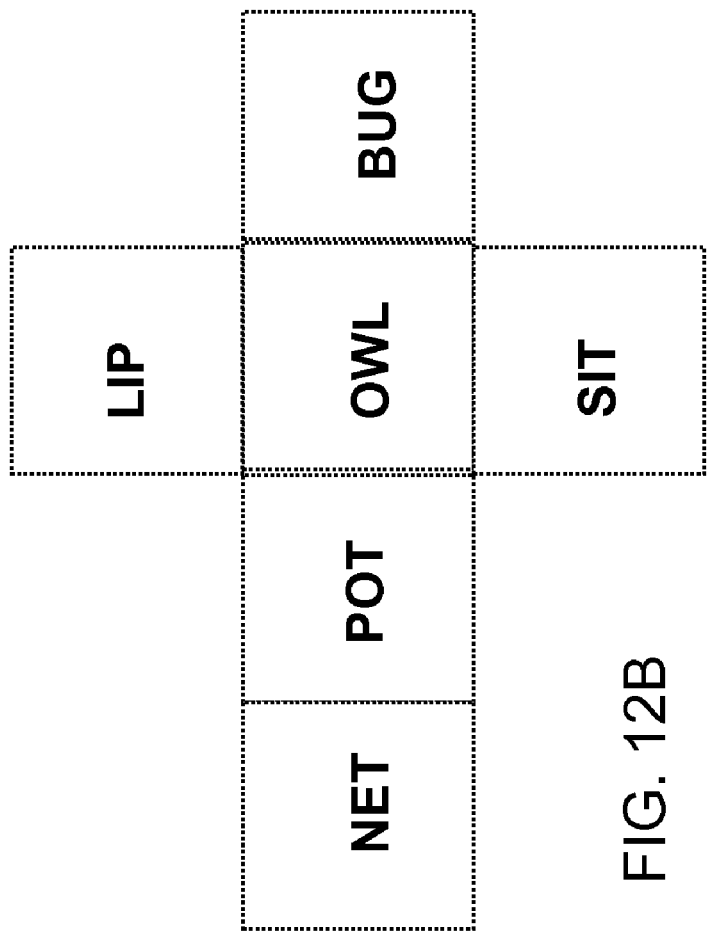
FIG. 12B presents the schematic layout for the instructional words presented on the six faces of the 3-D block in FIG. 6A.
Figure 12A:
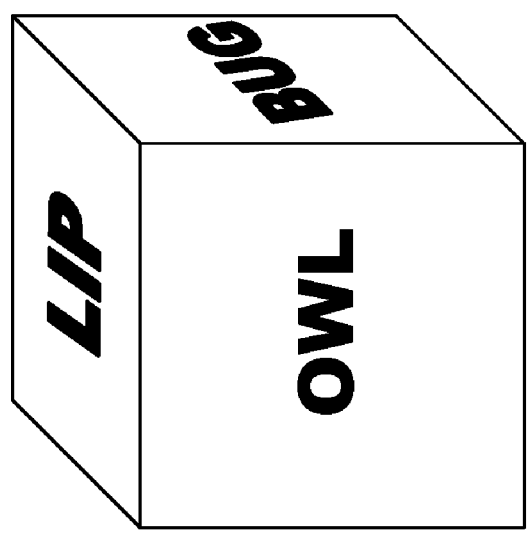
FIG. 12A illustrates a seventh 3-D instructional block of a set of eight such blocks according to an embodiment of the invention.
Figure 13B:
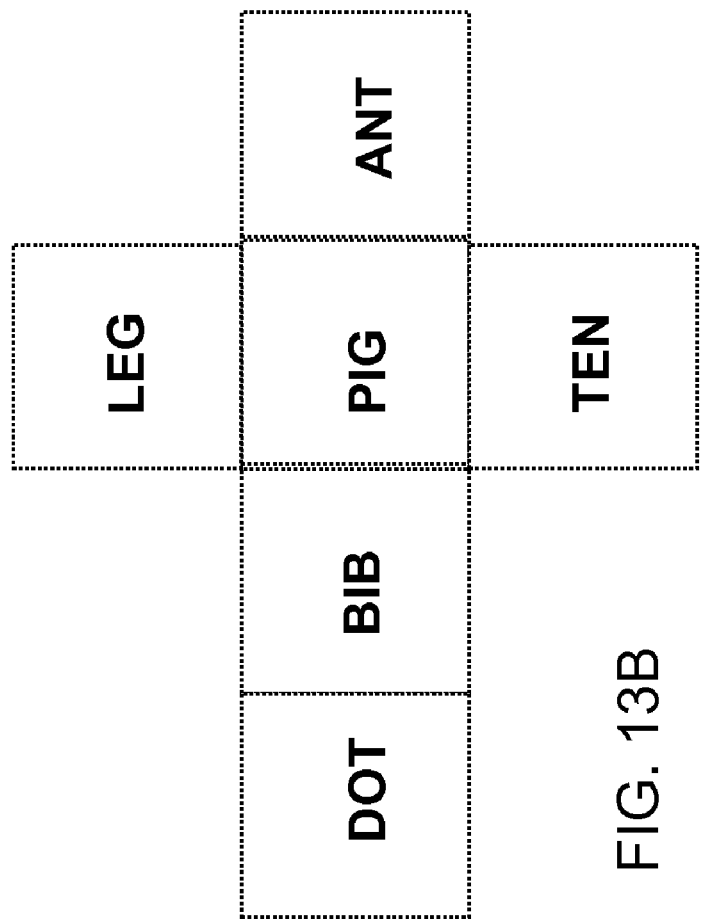
FIG. 13B presents the schematic layout for the instructional words presented on the six faces of the 3-D block in FIG. 6A.
Figure 13A:
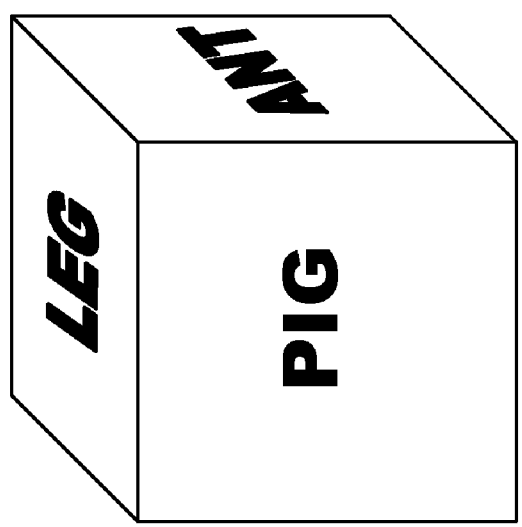
FIG. 13A illustrates an eighth 3-D instructional block of a set of eight such blocks according to an embodiment of the invention.
Figure 14A:
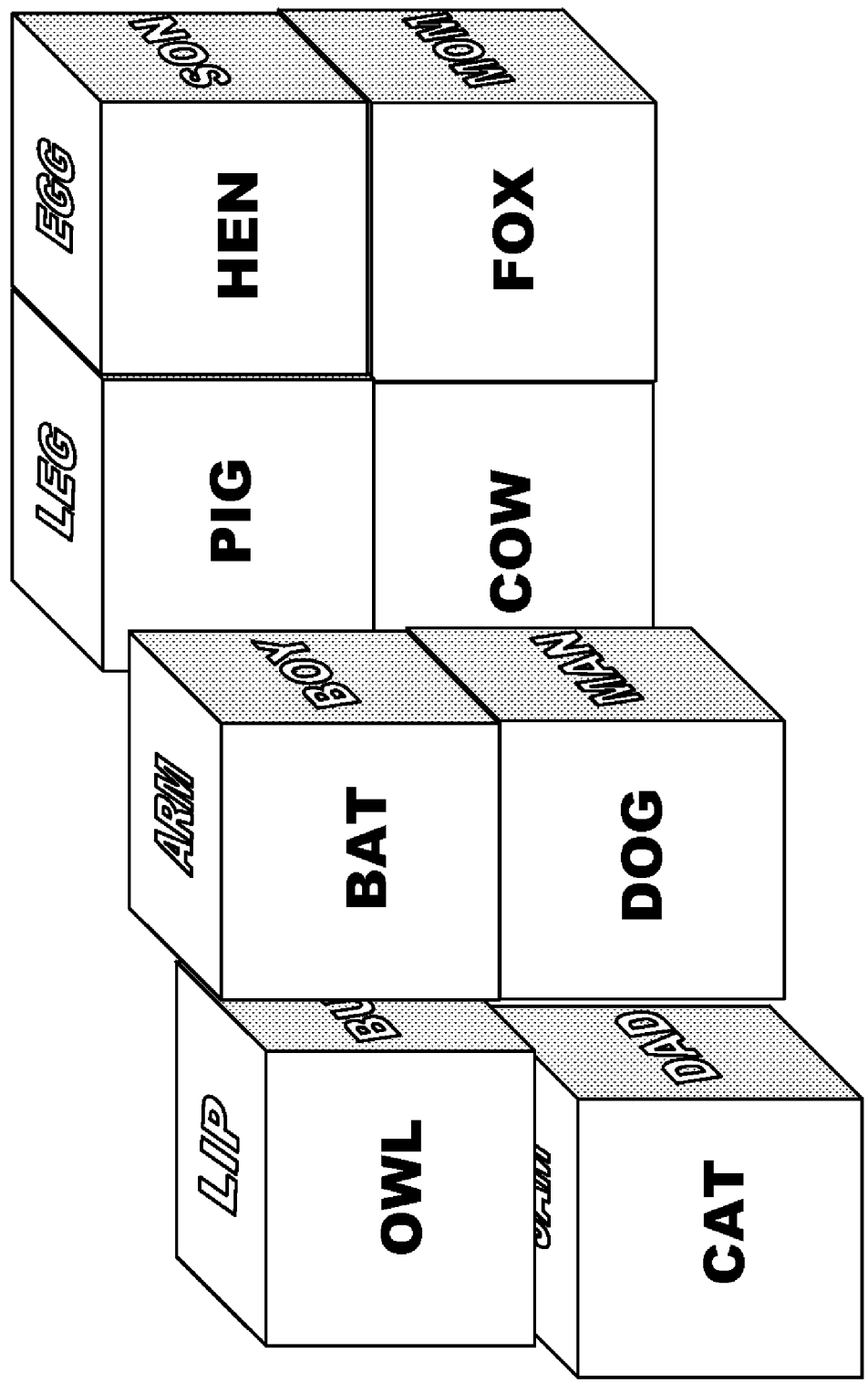
FIG. 14A illustrates stacking eight 3-D instructional block according to an embodied method of the invention, showing the advantage of words of differing thematic categories being distributed onto separate blocks.
Figure 14B:
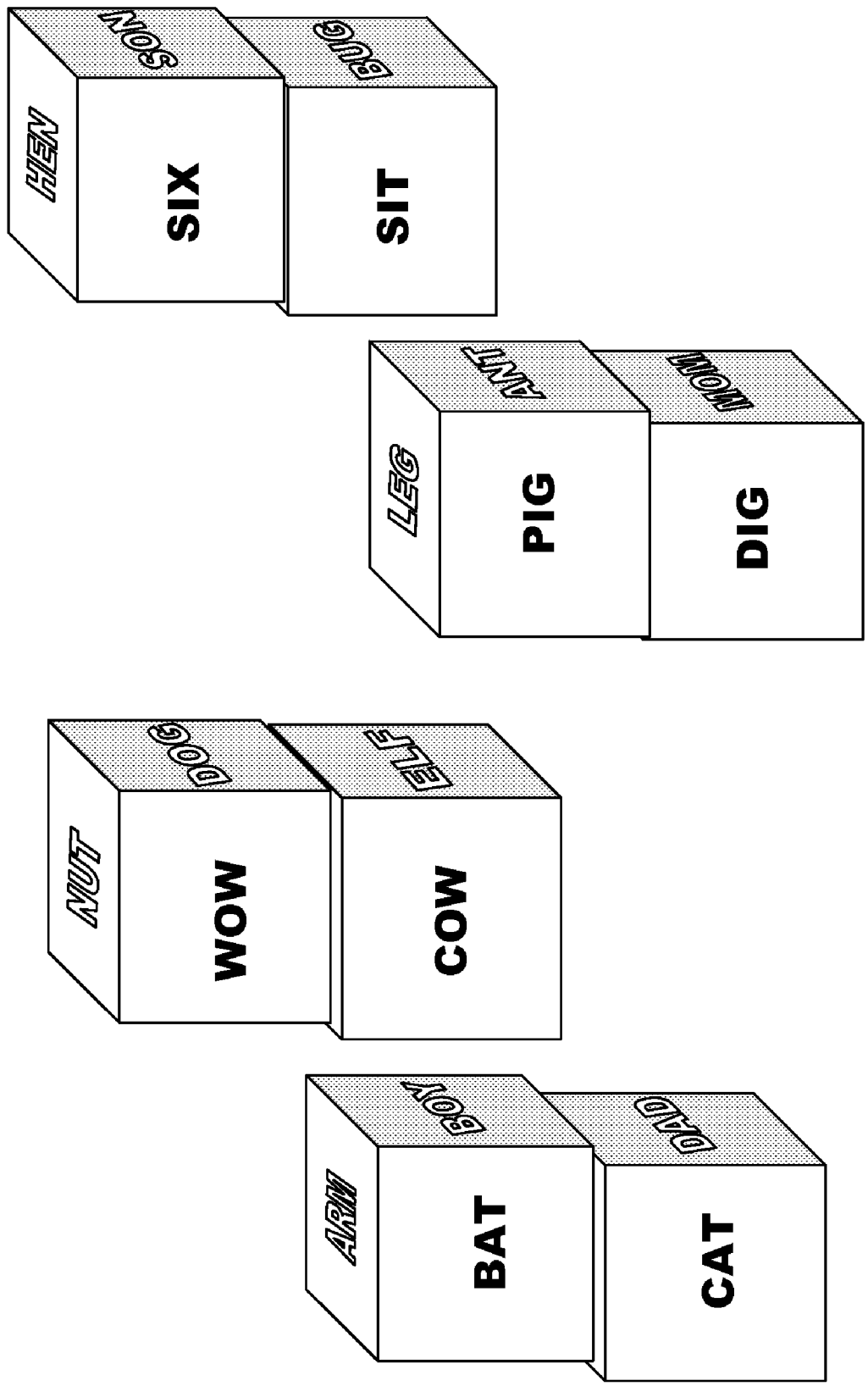
FIG. 14B illustrates an alternative stacking of the eight 3-D instructional blocks in FIG. 14A according to an embodied method of the invention, showing the additional advantage of words that are part of word-pair comparisons, such as BAT_CAT, WOW_COW, SIT_SIX and DIG_PIG, being distributed onto separate blocks.

Referring to FIG. 6A, a 3-dimensional (3-D) cube or 3-D block can present six instructional words, one on each face of the block, where FIG. 6B represents a schematic layout showing the six words that are applied to the six faces of the block in FIG. 6A. Similarly, as shown in FIGS. 7A-13B, a preferred embodiment of the invention provides for applying the training words of the specific 48-word training set described above to eight 3-D cubes or rectangular blocks, wherein a specific subset of six words is applied to each of the eight blocks, as follows:

Block #1 (see FIG. 6A-6B): BAT, BOY, ARM, NAP, CAN, LOG,

Block #2 (see FIG. 7A-7B): CAT, DAD, JAM, HUG, SUN, BOX,

Block #3 (see FIG. 8A-8B): COW, ELF, FAT, WET, MOP, BED,

Block #4 (see FIG. 9A-9B): DOG, MAN, NUT, PAT, WOW, TOY,

Block #5 (see FIG. 10A-10B): FOX, MOM, RED, DIG, CUP, TOP,

Block #6 (see FIG. 11A-11B): HEN, SON, EGG, SIX, JAR, BAG,

Block #7 (see FIG. 12A-12B): OWL, BUG, LIP, SIT, POT, NET,

Block #8 (see FIG. 13A-13B): PIG, ANT, LEG, TEN, BIB, DOT,

The specific configuration of training words on these eight 3-D blocks is important for using the blocks in the specific method of training according to the invention, so that subsets of blocks can be used together with one face of each block of the subset comprising one word of the training subset. The block faces can be all facing up, or they can be stacked facing in one direction, or they can be picked up and examined in a sequence, or other mode of training with the words on the subset of blocks. For example, as illustrated in FIG. 14, the specific configuration of eight blocks above can enable each of the following conceptual categories to be appear within subsets of the faces of the eight blocks:

mammals & birds: (BAT, CAT, COW, DOG, FOX, HEN, OWL, PIG)

people and insects: (BOY, DAD, ELF, MAN, MOM, SON, BUG, ANT)

body parts and food: (ARM, JAM, NUT, RED, EGG, LIP, LEG)

verbs and numbers: (NAP, HUG, WET, PAT, DIG, SIX, SIT, TEN)

kitchen objects: (CAN, SUN, MOP, WOW, CUP, JAR, POT, BIB)

other home objects: (LOG, BOX, BED, TOY, TOP, BAG, NET, DOT)

Further, the particular distribution of the words onto the blocks #1 through #8 as shown in FIGS. 6A-13B enables all of the words pairs described previously, above, to be compared by placing two blocks adjacent to one another. In other words, the distribution and configuration of words on the eight blocks is specifically designed such that the none of the word-pairs occurs on the same block. Furthermore, the specific design enables the symmetrical words and adjacent-consonant words also to be compared side-by-side, as none of these associated words occurs on the same block.

It will be appreciated that the scope of the invention is not limited to exactly the subsets described herein, but extends to similarly designed and implemented subsets that achieve the purpose and goals of the invention as described herein. It is anticipated that a word set that contains at least 20 of the 48 words in the above group is preferable in terms of meeting the objectives of the invention, while an instructional set that includes 24 of the words is more preferable, more preferable still is a set including at least 36 of the 48 words, and most preferable is a set that includes all 48 of the 48 words. It will be appreciated that sets containing 24 and 36 words can also be applied to sets of 4 and 6 instructional blocks, respectively. However, the set of 8 instructional blocks containing the 48 words of the above group is considered most preferable for engaging the interest of children and to provide the teacher with enough variety for story telling that interests the child.

Figure 15B:
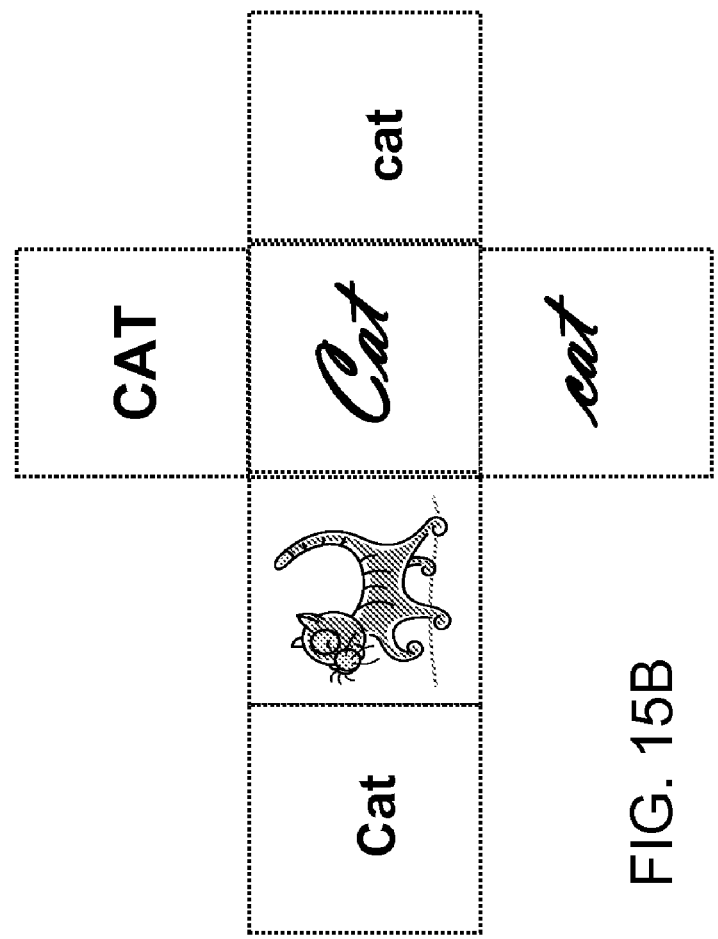
FIG. 15B presents the schematic layout for the instructional words and picture presented on the six faces of the 3-D block in FIG. 15A.
Figure 15A:
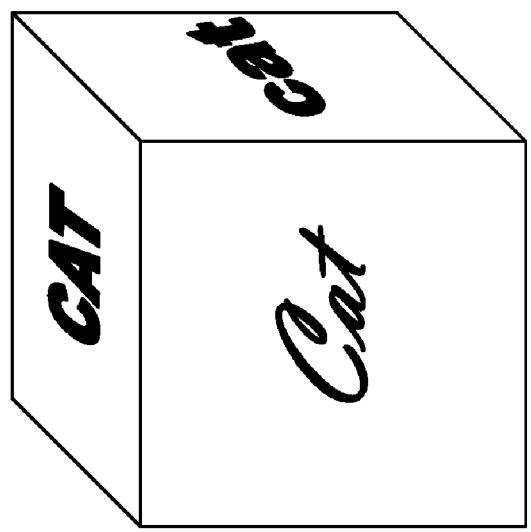
FIG. 15A presents an example of one of a set of 3-D blocks according to an embodiment wherein the block presents only one word in differing capitalization, font and script on five faces of the block and a picture corresponding to the word on the sixth face.

Referring to FIG. 15A, another embodiment of the invention provides for a set of 48 blocks, wherein each block is dedicated to each of the 48 words BUG, SON, SIX, ANT, PIG, BOX, ELF, NUT, TOY, BIB, BAT, TOP, DAD, CUP, LOG, FAT, ARM, SIT, WOW, PAT, DOG, MOM, DIG, EGG, MOP, JAM, LIP, BOY, BAG, RED, POT, WET, NET, HUG, CAT, SUN, BED, LEG, HEN, CAN, FOX, OWL, MAN, JAR, DOT, COW, NAP, and TEN. FIG. 15A shows an exemplary 3-D block for the instructional word "CAT", and FIG. 15B shows the schematic layout for the block, including the three faces not visible in the 3-D view; for example, the word "CAT" can be placed on a first face of the six-sided block capitalized printed letters, a second face having also the word "cat" in only small printed letters, a third face showing "Cat" with first-letter capitalized and remaining letters small, a fourth face showing "*cat*" in only small cursive script, a fifth face showing "*Cat*" in first letter capitalized and remainder small cursive script, and a sixth face showing a picture of a cat.

Figure 16:
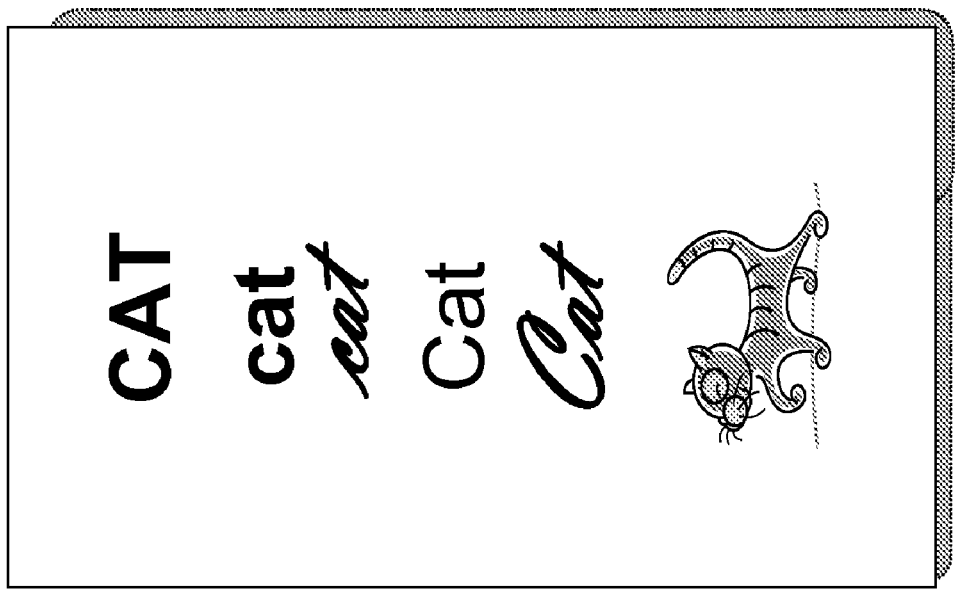
FIG. 16 presents an example of one of a set of flashcards according to an embodiment wherein the flashcard presents a word in differing capitalization, font and script on five lines of the flashcard and a picture corresponding to the word on the lower part of the face of the card.

Similarly, referring to FIG. 16 for illustration, flashcards (either in physical form on a card or other object, or graphically rendered by computer software) for any of the instructional sets described above, and/or subsets of these instructional sets, can be printed wherein each word exists in five rows on the flashcard, the first row being only capitalized printed letter or letters, the second row being only small printed letter or letters, the third row being mixed first-letter capitalized and remainder small letters, the fourth row being only small cursive writing and the fifth row being mixed first letter capitalized and remainder small cursive writing, and, optionally, a sixth row on each flashcard contains a picture depicting an object or action corresponding to the letter, letters or word thereon.

A further embodiment of the invention provides system and method for developing further progress in phonetic awareness and training in reading English words wherein the three-letter word set of C-V-C structure and short-vowel sound (and subsets thereof) are augmented by a small group of three-letter words of V-C-V structure and/or a small group of four-letter words of C-V-C-V structure, where the final vowel is a silent "E" for the words of both groups and the first-occurring vowels are pronounced with their long vowel sound. For example, without limitation, one such group of V-C-V words can be APE, EVE, IRE, ORE, and USE, and a set of C-V-C-V words can be GATE, HERE, FIVE, BONE, MULE, and LYRE. Preferably, the number of these words is small, in order to avoid a cumbersome instruction set that becomes more expensive to produce and purchase, and to avoid a set which can overwhelm beginning students in the very early stages of their phonetic instruction. It is anticipated that these augmented sets can be relatively more appropriate for older students, particularly those students for whom English is being learned as a second language.

Another embodiment provides for augmenting the instructional word set even further by adding at least one word beginning with or containing the letter "Q" which requires then the associated "U" and one or more letters, such as the three-letter "QUO" or "QUA", or four-letter "QUAD", or in longer words structured as C-V-V-C-C (e.g., QUICK or QUILT) or C-V-V-C-V (e.g., QUAKE or QUOTE). Another embodiment provides for further addition of words containing adjacent vowel pairs. Again, to be efficient and avoid building a cumbersome and/or confusing instructional set, it is preferable to limit this subset to represent a desired number of the approximately twenty different vowel pairs that occur in English words, such as, for example, a group of words that includes, or is drawn from, the group HAIR, AEROSOL, TAUT, SEAT, SEEN, VEIN, GEODE, NEURON, VIAL, PIER, TRIO, BOAT, TOE, COIN, MOON, OUT, GUARD, BLUE, JUICE, and BUOY.

An important value of the instructional system according to the invention is for students in foreign countries who are learning English as a second language. In these cases, however, the pronunciation training may be lacking, where the student may be working only with the flashcards themselves. In such cases, an embodiment provides for translation and pronunciation guides being placed on the reverse side of the flashcard in the native language of the student. Where the instructional set is presented on flashcard front, the back face of the flashcard contains a translation of the English word that is presented on the front, the translation being into one or more of the languages French, Spanish, Russian, Chinese, Japanese, Hindi, or other non-English language. The pronunciation guide provides the best approximation of the English phonetic sounds using the student's native language letters and/or pronunciation codes, such as codes that might be found in a language-to-language dictionary. Again, the phonetic simplicity of the instructional word sets according to embodiments of the invention, along with the strategic coverage using relatively fewer words, provides advantage for foreign students who may want to exercise their phonetic skills by referring frequently to the flashcard deck at various times of the day.

According to one preferred embodiment of the invention, generally, the learning system can be deployed on a stand-alone computer in the form of computer software, wherein the letters, words, cards and/or blocks can be graphically depicted in two or three dimensions on the computer screen. A further embodiment provides generally for the learning system to be enabled on a computer server and the computer program to be made available over a computer network, such as an intranet, or such as an internet, such as the World Wide Web, including a business method therefor.

Figure 17:
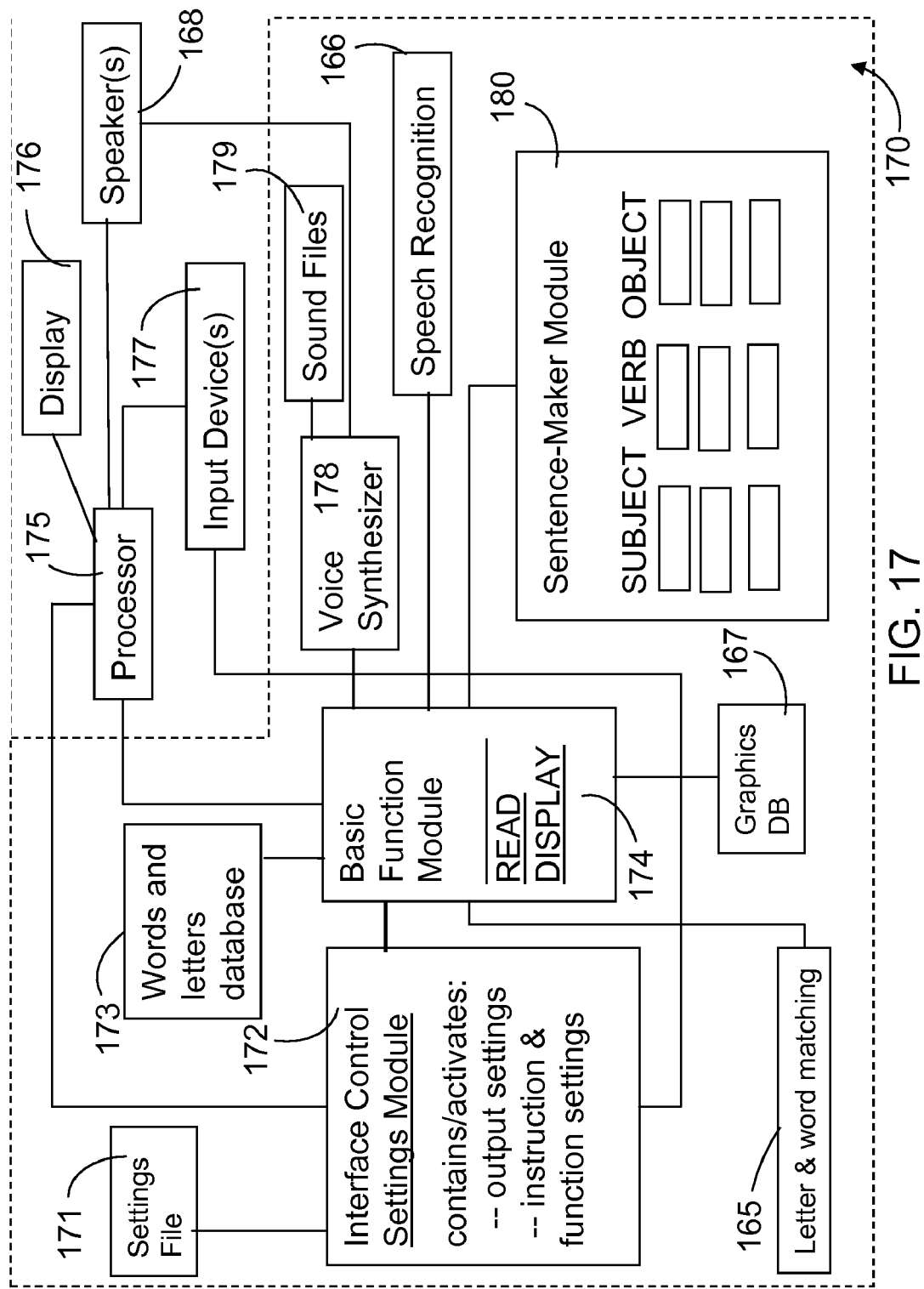
FIG. 17 illustrates a computer-enabled instructional reading program according to the invention.

Referring to FIG. 17, an embodiment provides an instructional reading computer program 170, showing program components and connectivity for a teaching and learning program. In one embodiment, a user can initiate the program 170 by controlling input device 177, such as, for instance, clicking on an executable program icon on a computer screen, speaking to the computer, or by initiating a Java program element on a web page (via a web browser), which can activate interface control sub-program 172 and basic function sub-program 174, which can lead to display of program menu screens, which can be customized and stored in settings file 171. If the user chooses to activate the reading functions, then the program can read the word list from the words and letters database 173 and can articulate these as spoken words via the voice synthesizer module 178, sound files 179 and one or more output devices 177, and/or can display these via display 176. Further, the program 170 can, via module 180, create at least a subset of sentences constructed from a subset of permissible subjects, permissible verbs and permissible objects, wherein each group of subjects, verbs and objects, respectively, has been pre-selected to create a viable English sentence through any arbitrary combination with any of the other associated subjects, verbs and/or objects (the words coming from the database 173).

Referring still to FIG. 17, an embodiment provides a computer, including a computer processor 175, readable and writable computer memory, and software program 170, which software program 170 controllably interacts with processor 175 (, one or more output devices, such as, without limitation, display 176 and/or other video output devices (such as a computer monitor, computer display panel, personal digital assistant display panel, digital telephone display panel, electronic book display, and/or electronic tablet display), and/or audio speaker or speakers 168, and/or other computer output devices known in the art, optionally at least one input devices 177 (including, without limitation, input devices such as a computer keyboard, computer mouse, electronic pen or scribe, trackball, touchpad, scanner, scanner with character recognition, microphone, and other known input devices). Words and/or letters stored in a words and letters database file 173 can be controllably displayed on display 176 and/or electronically spoken through speaker 168. The computer can comprise one or more electronic computing devices, such as, without limitation, a personal desktop computer, laptop computer, notebook computer, networked computing device, client/server configured computer. Optionally, a printer can be included as an output device.

Still referring to FIG. 17 and program 170, a subprogram or subroutine interface control setting module 172 can enable a user to change settings (such as, without limitation, output settings for display 176 or speaker 168, which settings can include control of graphics, volume, voice, lettering size, fonts, script, colors, background and other aspects visual scene and audio environment). For example, without limitation, settings can be changed to change the voicing of a letter or word by a virtual, synthesized voice speaking through the speaker 168 (such as, for example, choosing a child's voice, or a man's voice, or a woman's voice), and/or to change displayed letters and words from printed form to cursive form, and/or the display can be changed from displaying flash-cards on the screen to displaying word blocks that can be rotated in three dimensions, and/or to change a display background to scenery, and/or to segment the visual display into multiple windows, and/or to change the speed of operation of the program (including, without limitation, the speed of the program response and/or the time that the program can wait for human response to aspects of program interactivity. Settings can be stored in permanent or semi-permanent computer memory in a settings file 171, which can be stored on a computer disk in the operating computer, or on a portable disk (such as a CD, DVD, flash memory stick, or the like). In further embodiments, a settings file 171 can be stored on a network server on a local intranet and/or on the internet. The interface module 172 can allow individual users to have access to an individual settings file 171 unique to that user, which access can be secured by identification and/or authentification steps known in the art, which may include a userID and/or password. For example, an educational monitor or teacher could control the settings of the program for students accessing the computer in a user session (such as, without limitation, in a classroom or over the internet), or a student could control his or her own settings (in a classroom network, or on a personal computer at home, and/or over the internet). In a further embodiment, a language-teaching business manager can be enabled to control settings for one or more accounts for students and/or customers accessing the program via the Internet.

A basic functions subprogram 174 can be part of program 170 (FIG. 17), in which case basic functions program 174 can enable and control the program steps of reading a letter and/or word from the words and letters database 173 and displaying the letters and/or words on the display 176. Basic function sub-program 174 can also include subroutines for reading, either directly or indirectly (via other subroutines), data inputs from settings files 171, other data files, other input files and/or other data from a variety of input devices 177. The letters and/or words can be displayed in numerous ways, including, without limitation, as virtual flash-cards (such as, for example, depicting flash cards as illustrated in FIGS. 1-5), on virtual word blocks (such as, for example, depicting word blocks as illustrated in FIGS. 6A-15B). The graphics description and/or data for drawing specific flash-cards and/or word blocks, for example, can be also stored in the words and letters database 173 and/or in a separate graphics database 167, which graphics database can include drawings objects and/or data related to computer drawing capability, virtual reality modeling language (VRML) objects and/or data related to 3-dimensional computer drawing capability (such as, without limitation, XGL, or other graphics standards known in the art).

A sentence-maker module (SMM) 180, can be included in program 170 for assisting the user to learn how words are assembled as subject, verb and object. SMM 180 draws from the word and letters database 173 through the READ function of basic functions sub-program 174, ICSM 172 and processor 175, or from other similar word list(s) presented through input devices, wherein nouns in the list are available to be used as subjects and/or as objects, and verbs in the list are available to be verbs. The module 180 can be configured for differing degrees of complexity and difficulty in the settings module 172. For example, in a simplified setting, words in the database 173 that have associated data parameters that label these words as potential subjects, verbs and or objects are made available as a list to the module 180, which can randomly combine the words into simple sentences. For instance, database 173 can contain, from the word list of FIG. 5, the words "HUG", "PAT" and "SIT" in the category of permissible verbs and "DAD," "MOM," "SON" and/or "DOG" as permissible subjects or objects. For instance, "DOG SIT" can be constructed as a very simple two-word sentence, and "BOY HUG MOM" can be similarly created. The SMM 180 can further include the instruction to correct the verb conjugation to create the sentence "DOG SITS" or "BOY HUGS MOM." Further, the SMM 180 can create, at random or from a selectable list, at least the following sentences: "Dad hugs Mom; Mom hugs Dad; Dad hugs Son; Mom hugs Son; Mom hugs Dad; Son hugs Dad; Son hugs Mom, and similarly for the verb PAT.

Program 170 can be implemented in alternative software languages and configurations. For instance, it can be written in Visual Basic, C, C+, C++, C#, Perl, Java, LISP, Access and/or many other computer languages well known in the art, and/or in combinations thereof. For example, database files may be stored in Access or other commercial database structures and means known to persons skilled in the art of computer programming and/or writing software. It is to be understood that reference to software subprogram, subroutine, module, component or other program element can include implementation of program function as software objects, including all attendant and known methods of object-oriented software programming. Further, any description of software objects for a single computer are intended to include in the scope of the invention all similar software objects, such as Java, active server pages, applets, and other programming objects and/or methods for implementing the program capabilities in a web browser and/or within a client/server architecture running on a computer network, such as, for example, the Internet.

Embodiments of the invention provide for commercially available hardware, chips and/or software submodules to be combined with the basic software control code of program 170. For example, a LUMENVOX® Speech Engine (LumenVox, LLC, San Diego, Calif.) can be utilized for the voice recognition module 166, and/or speech-recognition modules can be written utilizing known methods associated with the SRGS 1.0 (Speech Recognition Grammar Specification, Version) published by the World Wide Web Consortium (Cambridge, Mass.). A further embodiment provides for a DEVANTECH™ SP03 Text-to-Speech module (Acroname, Inc., Boulder, Colo.) to be used for voice synthesizer module 178, which module can include a WINBOND™ WTS701 speech chip (Winbond Electronics Corporation America, San Jose, Calif.), as well as an audio amplifier, a 3-Volt regulator and level conversion to 5 Volts, a reduced instruction set computer microcontroller (such as a peripheral interface controller—PIC) processor in order to provide easier communication with the host processor 175, a small 40 mm speaker, an RS232 serial interface, I2C bus interface, and a parallel interface. The parallel interface can used for selecting one of a plurality of predefined phrases. Arbitrary text can be sent to the module via the RS232 and I2C interfaces and can be spoken on-the-fly, allowing the user to input combinations of letters and words and the program to respond by reading the input letters and words. Alternatively, the program can read, or voice, letters and words from preprogrammed voicing for the letters and words contained in the database 173 and/or in an additional grammatical database. The program can match this output to the input from the user, either by 100% match recognition or by approximate matching, i.e., where a lesser degree of matching indicates by a deterministic and/or probability function one or more likely word matches.

Word and/or letter matching can be incorporated in program 170 as a subroutine or program object matching function 165. Matching function 165 can take output from one or more input devices and/or from voice recognition module 166 and match the input to one or more of the databases, such as words and letters database 173, which database can include grammatical data. The matching can be programmed as taking a user input, parsing and/or converting that input to an input string and testing for equivalence against a "match-test string" that is read by a sequential stepping and reading through the database records. Such matching routines can be similar to those used for word-matching in text-searching and/or spell-checking routines, which are well-known to persons skilled in the art of writing software. The program can produce differing output depending on the degree of match, wherein 100% matches can, for example, produce "positive" graphic and/or audio output responses and lesser degree of match can produce "negative" graphic and/or audio responses from the instructional system. The program can be enabled (for example, by setting instructions and functions in settings module 172 to allow a function whereby a random or preselected sequence of words will be displayed on the display 176, then the program will wait for user audio input, the audio input will be tested for degree of match, and response from the system will provide the user with an indicate of the degree of match. Optionally, the response can contain a synthesized or recorded voice playback of the proper pronunciation of the letter or word, and or sentence.

It will be appreciated and understood that the writing of the software program code for each subroutine or software object, as well as the connecting of the software components or objects for database control, for reading from databases, for displaying program output, for voice recognition, for voice synthesis and generating audio output, for programming system response to user input, for word-matching and/or for constructing sentence sequences from sentence-construction rules in module 180 is within the skills of and can be accomplished by a software programmer skilled in known and existing programming methods.

Also, it will be appreciated and understood that embodiments can provide for alternative software program configurations closely related to program 170, such as, for example, programs having only a subset of the components depicted in program 170, and/or programs having additional subprograms and/or subroutines known in the art.

Figure 18:
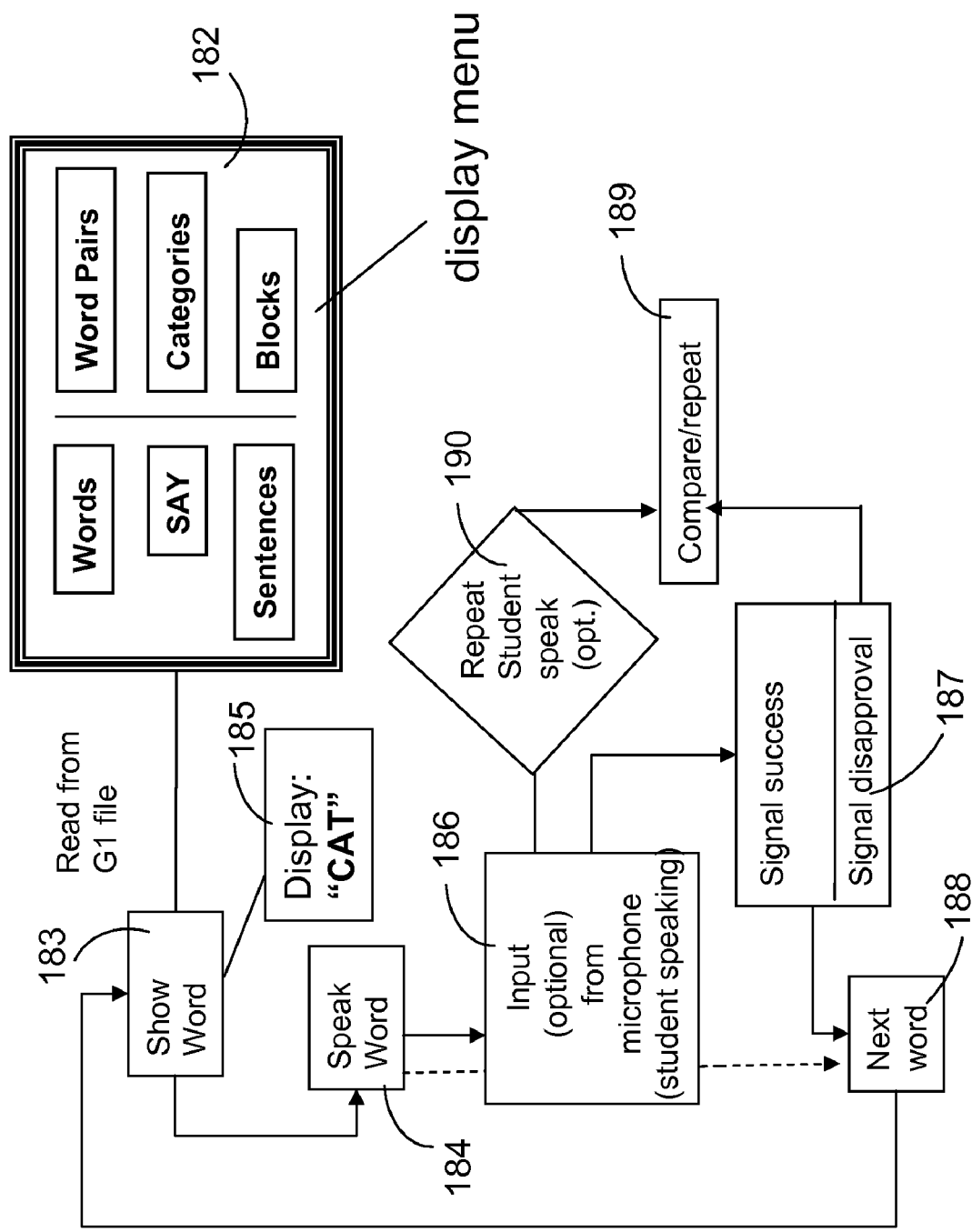
FIG. 18 illustrates functional steps in an instructional program of an embodiment according to the invention.

Referring to FIG. 18, an embodiment provides for steps in a method of early instruction in language, which steps also illustrate a series of functional/use steps for an instructional program, comprising: at step 183 a word from a list (or a group) of words is shown to the student; at step 184 the student speaks (or reads) the word; at step 187 a feedback response is given to the student as a signal of success or a signal of disapproval; if successful, then at step 188 the method moves to a next word, whereupon the method returns to step 183, with the method cycling or iterating until the list or group of words is exhausted. The step 183 of showing a word can include display step 185. In a computer implementation, the program can read from a Group 1 file (which can be a letters and words database 173 in FIG. 17), which can be selected based on a set of menu choices, such as menu choices illustrated in display menu 182, which can include, for example, without limitation, "Words", "SAY", "Sentences", "Word Pairs", "Categories", and "Blocks". The instructional method step 184 of speaking the word can include an optional step of an audio input being received from a microphone as the student speaks. Also, optionally, the program can be simplified to only steps 183 and 184, where the student reads through a list of words. Where feedback is given, following step 187, the instructional program compares the student's reading to the word to a standard (known, correct, recorded and/or combination thereof) version of the word and the program (through playback of a recorded version, or through a speech synthesis module) speaks the word back to the student, whereupon the student repeats his or her own input at step 186, again proceedings to step 187 for a signal of success or disapproval.

Figure 19:
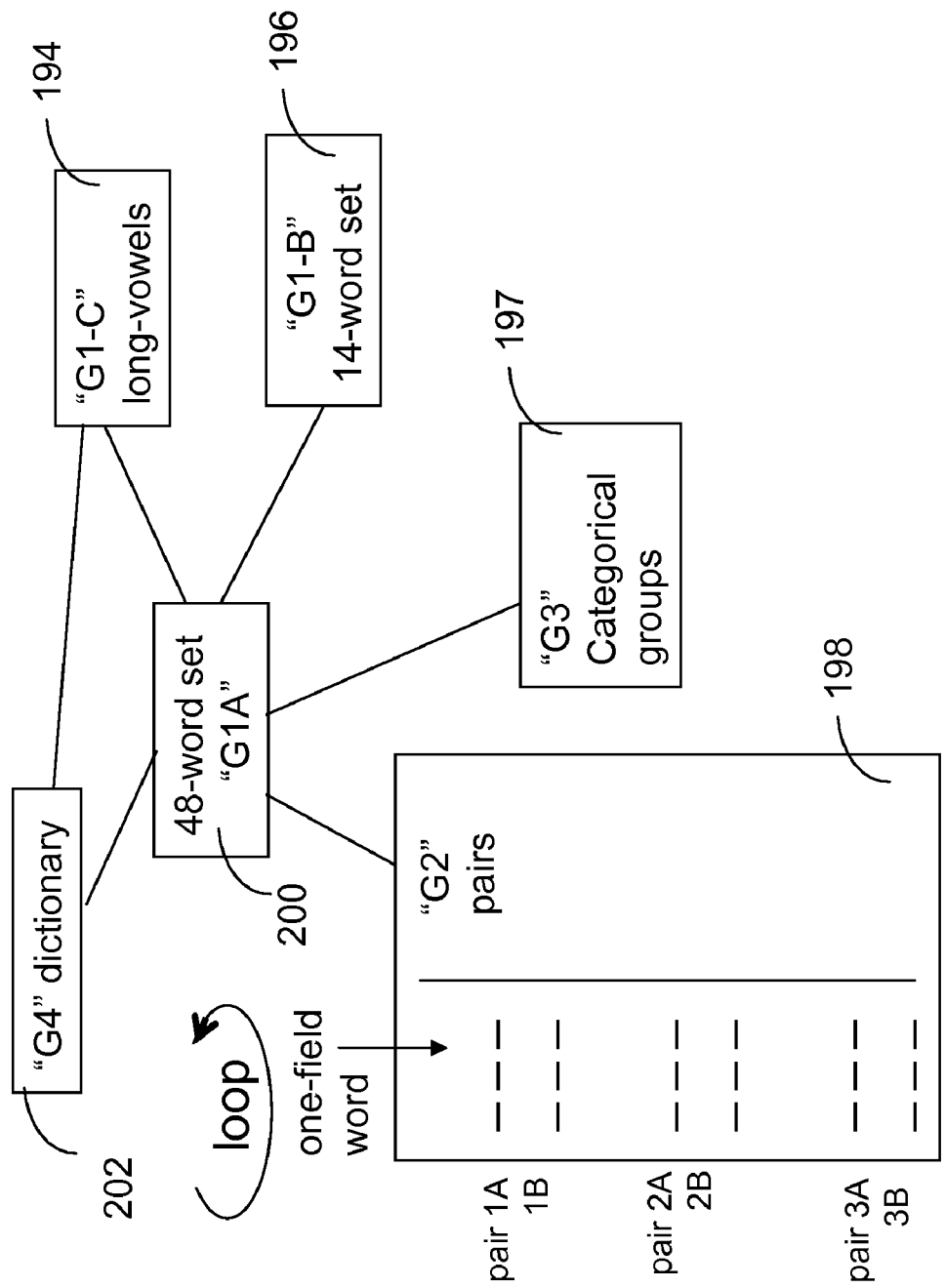
FIG. 19 illustrates a plurality of word sets and subsets according to an embodiment of the invention.

Referring to FIG. 19, a preferred embodiment of an instructional system provides one or more subgroups 196, 197, 198 within a larger set of words 200, which larger set can itself be a subset of a larger dictionary 202, which can be a standard English dictionary or a portion of such a dictionary. Another group of words 194 can have some words common with the larger set 200, as well as additional words from the dictionary 202, such as, for example, a set of words having long vowel sounds. For example, 48-word set 200 can comprise a 14-word subset 196 with similar characteristics, as well as a word subset 197 characterized by membership in a category (such as, for example, a category "mammals" or a category "colors"). The 48-word set 200 can also comprise another subset 198 of word pairs, wherein two words comprising the pair (pair 1A_1B) differ by only a single letter and by a single sound, such as, for example, a word pair BAG_BAT. The group file can be structured sequentially so that when a student is practicing with Word Pairs (for example, having selected that function from display menu 182 in FIG. 18) the program can loop through each word of the pair stored as one field in a separate record. Similarly, the word pairs can be displayed as a group 198 on the screen using the layout shown in FIG. 19.

Figure 20:
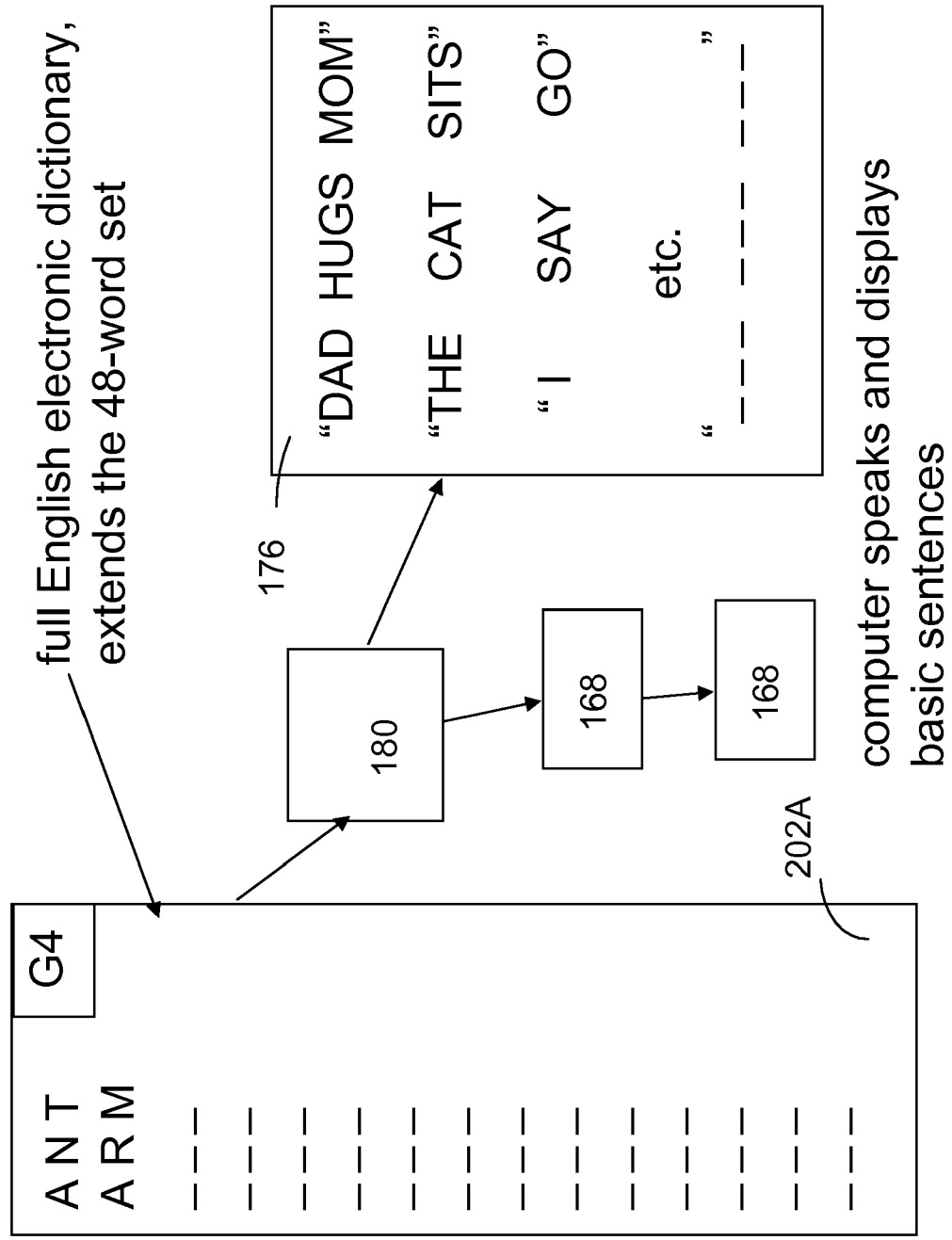
FIG. 20 illustrates an enlarged electronic dictionary (Group 4-G4) that is larger than and extends the 48-word subset and the instructional program forming sentences from the enlarged G4 word set.
Figure 21:
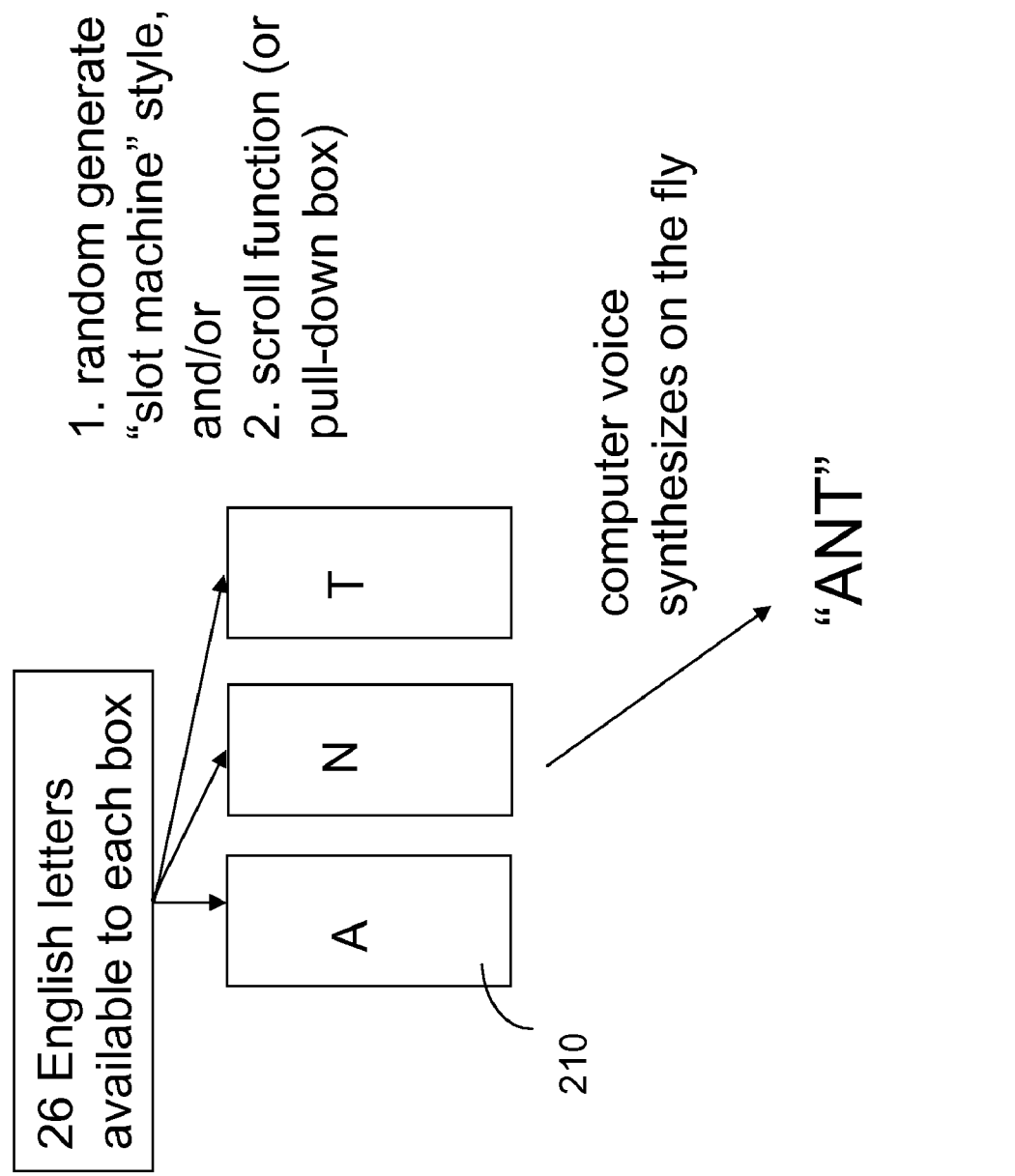
FIG. 21 illustrates a three-window word-forming configuration, as in a computer display, wherein each window hosts and single letter, the three windows together forming a three-letter word, the word spoken by the computer speech synthesizer on-the-fly.
Figure 22:
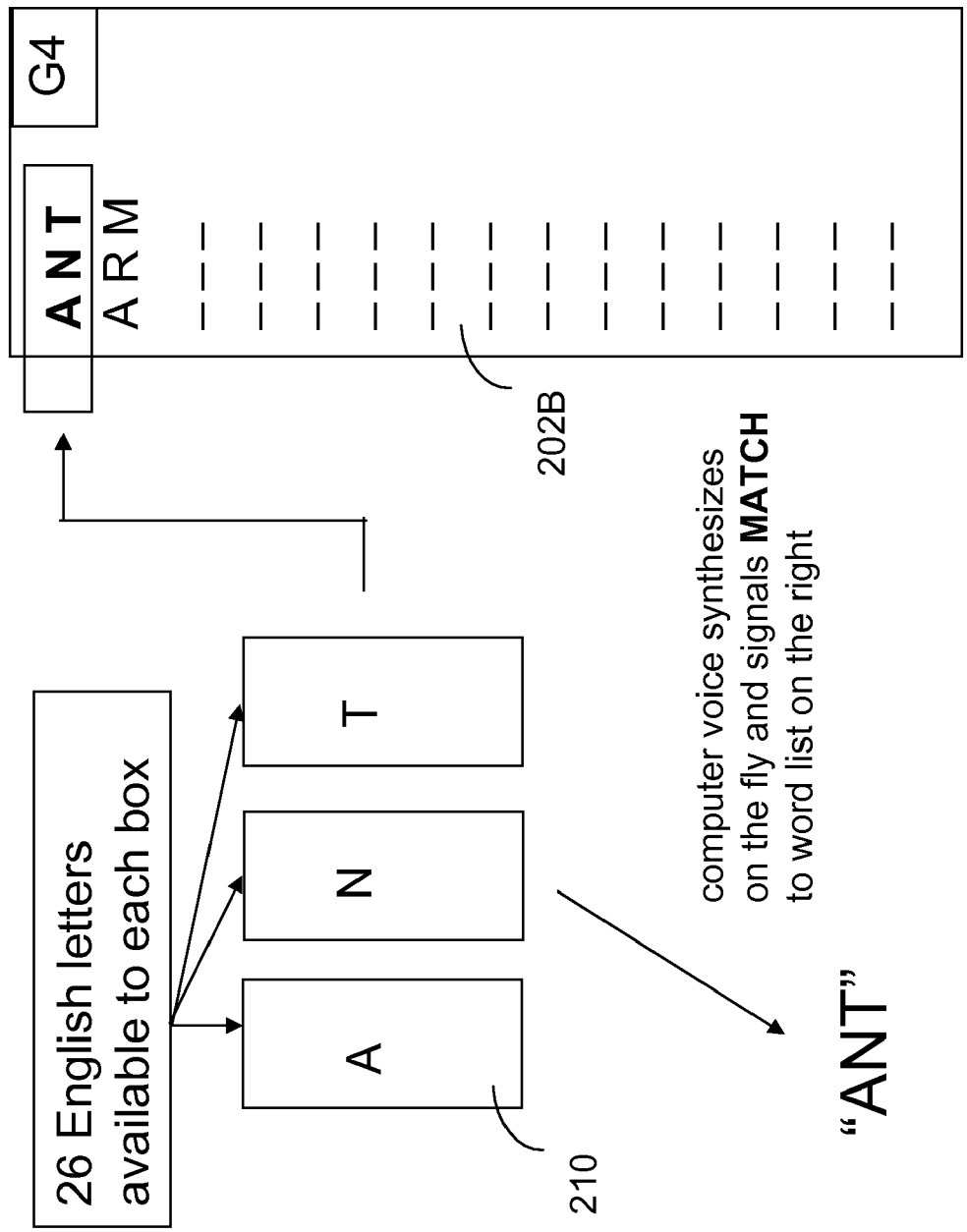
FIG. 22 illustrates a function in an instructional reading program according to an embodiment of the invention wherein 26 English letters are available to each of three screen boxes and the three-letter word created is matched against a dictionary list (Group 4) and is further read by the synthesized computer voice.

Referring to FIG. 20, an enlarged electronic dictionary 202A can be used in the instructional program to form sentences (such as can be implemented by the sentence-making module 180 of FIG. 17). A display 176 can simply display the sentences (or can comprise three side-by-side windows wherein each window contains a word, with the three windows together displaying the sentence) and synthesizer 178 and speaker(s) 168 can provide an audio output that speaks the sentence. A three-window, word-forming function can be implemented and displayed on a computer display (FIG. 21), wherein each window 210 shows a single letter, the three windows together forming a three-letter word, and the word can be spoken by the computer speech synthesizer on-the-fly. A function in an instructional reading program according to an embodiment of the invention can include a function wherein 26 English letters are available to each of three screen boxes and the three-letter word created is matched against a dictionary 202B and is further read by the synthesized computer voice (FIG. 22).

Figure 23:
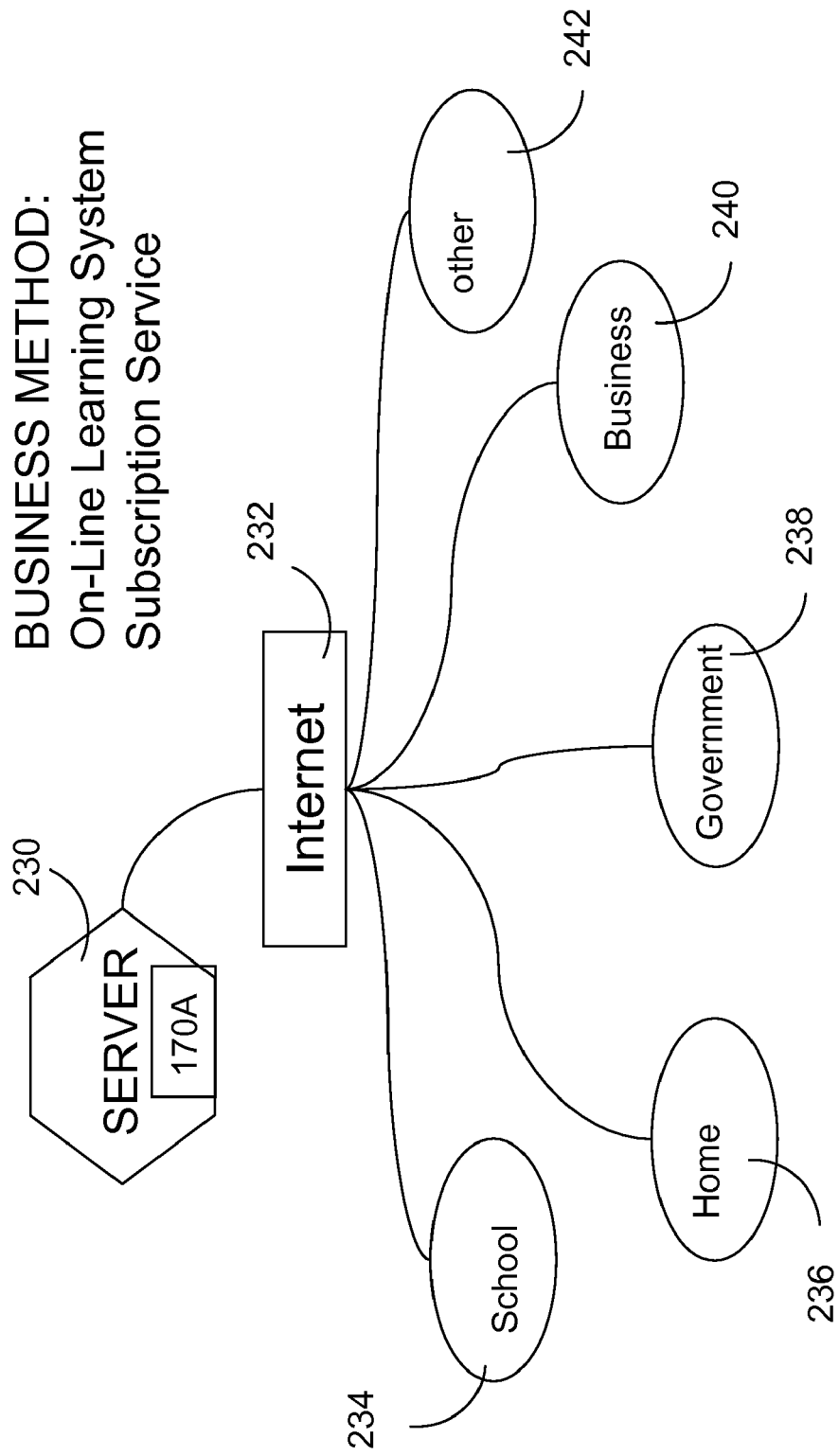
FIG. 23 illustrates an on-line learning system according to the invention and a business method whereby a computer-enabled instructional program is made active and available from a provider/server through a computer network, such as, for example, the Internet and/or World Wide Web, to a plurality of clients, including schools, homes, government offices, businesses and other clients, locally, nationally and internationally.

Referring to FIG. 23, an on-line learning system can be combined with a business method according to an embodiment of the invention whereby the instructional program 170A is made active and available from a provider/server through a computer network 232, such as, for example, the Internet and/or World Wide Web, to a plurality of clients 234-242, including schools 234, homes 236, government offices 238, businesses 240 and other clients 242, locally within one state or geographic region, nationally within one country, such as, for example, within the United States, and/or internationally. Active Server Pages and standard subscription authorization software (using membership authorization available through, for example, Secure Socket layer and/or Transport Layer Security standard protocols) can initiate the browser-to-server connection, followed by JavaScript applet initialization of the program to display and run on the client. The program can use Active-X controls, C# programming, and/or other programming techniques as appropriate.

It will be appreciated that herein the invention has been frequently described in the context of embodiments that comprise system and methods for early instruction in the English language; however, it is to be understood that it is within the scope of the invention to include the novel aspects of the invention as applied to instruction in any language and or dialect, including, without limitation, Spanish, French, Russian, Chinese, Japanese, Hindi, German, Portugese and the plurality of other known languages used by the peoples of the peoples of more than 120 countries of the United Nations. Novel aspects of embodiments of the invention as applied to languages other than English can at least include one or more of the following aspects, without limitation:

- specifying a first subset of words that are of few letters (preferably three letters) and are phonetically simple and unambiguous, which subset is designed to teach the consonants and short vowel sounds first, where the first subset of words is preferably fewer than 100 words, and preferably fewer than 50 words, and wherein the subset of words is chosen to describe at least one mammal, bird, bug, part of the body, food, color, and natural object, and at least one verb, as part of the instructional process;
- optionally forming and formatting the subset of words in bold, capital letters on the face of a strong, cardboard flashcard that of dimensions about 5"×7"×1/16";
- optionally specifying a subset of x words, where x=0 (mod 6) and x>6, where the words are placed on x/6 blocks, each word to one face of a block, where each word of an instructional group of y words within the subset of x words, where y=1, 2, . . ., x/6, are distributed on different blocks;
- optionally the system and/or methods above are implemented through an interactive client/server configuration on a computer network, such as the Internet, which can be part of a business method for language instruction that includes a one-time fee-for service, or ongoing subscription fee, which can include speech recognition and speech synthesis as part of the system and/or method.

Equivalents

While the invention has been described in connection with specific methods and materials, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. An educational apparatus for teaching phonics, spelling and reading, the apparatus comprising
a plurality of structural units, each including a first face and at least one additional face,
a 3-letter word indicia imprinted upon each of said first faces, one word to a face, wherein each of said 3-letter word indicia indicates a different word,
a 3-letter word indicia printed on the at least one additional face of each of the plurality of structural units,
wherein each 3-letter word indicia on each of the said first faces constitutes a first word member of an instructional word-pair of which instructional word-pair a second word member is located on a face of another of the plurality of structural objects,
wherein each instructional word-pair comprises two 3-letter words differing by substitution of a single letter.

2. The educational apparatus of claim 1, wherein each 3-letter word indicia is an English word.

3. The educational apparatus of claim 2, wherein the apparatus comprises structural units having a totality of between 11 and 49 faces, each face bearing 3-letter word indicia imprinted thereon, including one face bearing a word beginning with the letter "Q" and wherein all the letters of the English alphabet are represented at least once in the word indicia imprinted on the faces, and each vowel A, E, I, O and U occurs as the only vowel in at least two words,
wherein a 3-letter word indicia on one first face of a first structural unit is a first word member of an instructional word-set of at least eight words, which instructional word-set further comprises
nouns pertaining to at least one mammal, bird, bug, part of the body, food, color, and natural object, and at least one verb.

4. The educational apparatus of claim 3, wherein the faces bear the imprinted words BUG, COW, FOX, HEN, KIT, JAM, LEG, QUA, RED, SUN, VAT, YES, WET, and ZIP.

5. The educational apparatus of claim 2 wherein
the apparatus comprises structural units having a totality of between 11 and 49 faces, each face bearing 3-letter word indicia imprinted thereon, the words being drawn from the group BUG, SON, SIX, ANT, PIG, BOX, ELF, NUT, TOY, BIB, BAT, TOP, DAD, CUP, LOG, FAT, ARM, SIT, WOW, PAT, DOG, MOM, DIG, EGG, MOP, JAM, LIP, BOY, BAG, RED, POT, WET, NET, HUG, CAT, SUN, BED, LEG, HEN, CAN, FOX, OWL, MAN, JAR, DOT, COW, NAP, and TEN.

6. The educational apparatus of claim 5, wherein the faces bear indicia representing 48 words drawn from the group.

7. The educational apparatus of claim 6, wherein each of the 48 words are presented on a separate face of each of eight 3-D blocks, wherein a first 3-D block contains the words BAT, BOY, ARM, NAP, CAN, and LOG, a second 3-D block contains the words CAT, DAD, JAM, HUG, SUN, and BOX, a third 3-D block contains the words COW, ELF, FAT, WET, MOP, and BED, a fourth 3-D block contains the words DOG, MAN, NUT, PAT, WOW, and TOY, a fifth 3-D block contains the words FOX, MOM, RED, DIG, CUP, and TOP, a sixth 3-D block contains the words HEN, SON, EGG, SIX, JAR, and BAG, a seventh 3-D block contains the words OWL, BUG, LIP, SIT, POT, and NET, and an eighth 3-D block contains the words PIG, ANT, LEG, TEN, BIB, and DOT.

8. The educational apparatus of claim 6, wherein each of the 48 words is presented on each of 48 3-D blocks, wherein each word is placed on a first face of the block in only capitalized printed letters, on a second face in only small printed letters, on a third face with first-letter capitalized and remaining letters small, on a fourth face in only small cursive script, on a fifth face in first letter capitalized cursive and remainder small cursive script, and upon a sixth face is shown a picture depicting an object or action corresponding to the word presented on that block.

9. The educational apparatus for teaching phonics, spelling and reading, according to claim 6, wherein the plurality of structural units are eight 3-dimensional blocks, each block having six faces.

10. The educational apparatus for teaching phonics, spelling and reading according to claim 1, wherein the plurality of structural units are 3-dimensional blocks, each having six faces.

11. The educational apparatus according to claim 1 wherein the plurality of structural units, each including a first face and at least one additional face, are at least one of flashcards, computer graphic representations, magnetic surfaces, 3-D blocks, and clothing.

12. The educational apparatus of claim 1, wherein the three-letter words comprise at least 20 word-pairs.

13. The educational apparatus of claim 1, wherein the instructional word-pairs further comprise at least one word-pair in which the sequence of letters of the first member is reversed in the second member,
and
wherein the words are placed on a face of structural units that comprise two or more three-dimensional blocks, one word to a face, and the first and second words of the at least one word-pair are positioned on different blocks.

14. The educational apparatus of claim 1, wherein a set of words corresponding to the words imprinted on faces of the structural units further comprises
at least one symmetrical word that reads the same forward or backward,
at least one forward-backward word-pair wherein the first word of the word-pair reads in reverse with respect to the second word of the word-pair,
at least one word-pair wherein only the first letter changes between the pair,
at least one word-pair wherein the last letter changes between the pair, and
at least one word-pair wherein the middle letter changes between the pair.

15. An educational method for teaching phonetic awareness and reading by using a plurality of structural units, whereby each structural unit comprises a three-dimensional body and a plurality of faces, the method comprising the steps of
imprinting a 3-letter word on one of the faces of each of the structural units,
assigning an associated 3-letter word as a second member of an instructional word-pair to be associated with the 3-letter word of said imprinting step, wherein the associated second member comprises at least two letters in common with the imprinted word, and
marking said associated second member on a face of a different structural unit, one word to a face.

16. The educational method according to claim 15,
wherein the step of assembling a set of three or more structural units the faces of which comprise a set of three-letter words of between 13 and 49 three-letter words further comprises assembling a set of nouns pertaining to at least one mammal, bird, bug, part of the body, food, color, and natural object, and at least one verb, and the method further comprising the step of using the structural units to improve the phonetic awareness of a student by creating discourse with the student on the topic of at least one of the at least one mammal, bird, bug, part of the body, food, color, and natural object, and at least one verb.

17. The educational method according to claim 16, wherein the step of assembling a set of three or more structural units the faces of which comprise a set of three-letter words of between 13 and 49 three-letter words further comprises assembling a set of between 24 and 49 three-letter words, marked one word to a face, drawn from the group BUG, SON, SIX, ANT, PIG, BOX, ELF, NUT, TOY, BIB, BAT, TOP, DAD, CUP, LOG, FAT, ARM, SIT, WOW, PAT, DOG, MOM, DIG, EGG, MOP, JAM, LIP, BOY, BAG, RED, POT, WET, NET, HUG, CAT, SUN, BED, LEG, HEN, CAN, FOX, OWL, MAN, JAR, DOT, COW, NAP, and TEN.

18. The educational method according to claim 16 further comprising the set of three-letter words of between 13 and 49 includes nouns pertaining to at least four people, five mammals, two birds, two bugs, three parts of the body, three foods, four kitchen objects, a color, two numbers and two natural objects, and at least five verbs, and wherein the step of using the instructional system to improve the phonetic awareness of a student further comprises wherein discourse with the student is engaged on the topic of at least four people, five mammals, two birds, two bugs, three parts of the body, three foods, four kitchen objects, a color, two numbers and two natural objects, and at least five verbs, as part of the instructional process.

19. The educational method for teaching phonetic awareness and reading by using a plurality of structural units according to claim 15, further comprising the steps of picking a first structural unit and displaying a first face of the first structural unit, the first face showing a imprinted 3-letter word imprinted thereon, reading aloud the imprinted 3-letter word, displaying alongside the first structural unit a second member of the instructional word-pair corresponding to the imprinted 3-letter word, reading aloud the second member of the instructional word pair, and pointing to the difference in spelling between the words of the word pair.

20. The educational method according to claim 15, wherein the method further comprises assembling a set of three or more structural units comprising a set of three-letter words of between 13 and 49 three-letter words that have the structure consonant-vowel-consonant, wherein all the letters of the alphabet are represented in the set and each vowel A, E, I, O and U occurs as the only vowel in at least two words.

* * * * *